US012145305B2

(12) United States Patent
Wolfe et al.

(10) Patent No.: US 12,145,305 B2
(45) Date of Patent: *Nov. 19, 2024

(54) BLOW MOLDER CONTROL SYSTEMS AND METHODS

(71) Applicant: AGR International, Inc., Butler, PA (US)

(72) Inventors: Georg V. Wolfe, Greensburg, PA (US); Jeff Schneider, Pittsburgh, PA (US); William E. Schmidt, Gibsonia, PA (US)

(73) Assignee: AGR International, Inc., Butler, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/128,587

(22) Filed: Mar. 30, 2023

(65) Prior Publication Data

US 2023/0241831 A1     Aug. 3, 2023

Related U.S. Application Data

(63) Continuation of application No. 18/049,656, filed on Oct. 26, 2022, which is a continuation of application
(Continued)

(51) Int. Cl.
*B29C 49/78* (2006.01)
*B29C 49/12* (2006.01)
(Continued)

(52) U.S. Cl.
CPC ............ *B29C 49/786* (2013.01); *B29C 49/12* (2013.01); *B29C 49/6409* (2013.01);
(Continued)

(58) Field of Classification Search
CPC .................. B29C 49/786; B29C 49/12; B29C 2049/78755; B29C 2049/7876
See application file for complete search history.

(56) References Cited

U.S. PATENT DOCUMENTS

| 5,250,335 A | 10/1993 | Maruhashi |
| 5,591,462 A | 1/1997 | Darling et al. |

(Continued)

FOREIGN PATENT DOCUMENTS

| DE | 10231345 A1 | 10/2003 |
| DE | 102008052609 A1 | 4/2010 |

(Continued)

OTHER PUBLICATIONS

Ron Puvak, "Improving PET Production Efficiencies via On-Line Inspection and Rejection of Defective Preforms and Finished Containers", Presented at EUROPAK, 1992.

*Primary Examiner* — Robert B Davis
(74) *Attorney, Agent, or Firm* — K&L Gates LLP

(57) ABSTRACT

Systems and methods control the operation of a blow molder. An indication of a crystallinity of at least one container produced by the blow molder may be received along with a material distribution of the at least one container. A model may be executed, where the model relates a plurality of blow molder input parameters to the indication of crystallinity and the material distribution and where a result of the model comprises changes to at least one of the plurality of blow molder input parameters to move the material distribution towards a baseline material distribution and the crystallinity towards a baseline crystallinity. The changes to the at least one of the plurality of blow molder input parameters may be implemented.

20 Claims, 22 Drawing Sheets

Related U.S. Application Data

No. 17/495,421, filed on Oct. 6, 2021, now Pat. No. 11,597,135, which is a continuation of application No. 16/245,805, filed on Jan. 11, 2019, now Pat. No. 11,155,018, which is a continuation of application No. 15/840,774, filed on Dec. 13, 2017, now Pat. No. 10,183,440, which is a continuation of application No. 15/367,392, filed on Dec. 2, 2016, now Pat. No. 9,868,247, which is a continuation of application No. 14/652,383, filed as application No. PCT/US2014/050734 on Aug. 12, 2014, now Pat. No. 9,539,756.

(60) Provisional application No. 61/864,905, filed on Aug. 12, 2013.

(51) Int. Cl.
  *B29C 49/64* (2006.01)
  *B29K 67/00* (2006.01)
  *B29K 105/00* (2006.01)
  *B29L 31/00* (2006.01)

(52) U.S. Cl.
  CPC .... *B29C 49/78* (2013.01); *B29C 2049/78755* (2022.05); *B29C 2049/7876* (2022.05); *B29K 2067/003* (2013.01); *B29K 2105/258* (2013.01); *B29K 2995/0022* (2013.01); *B29K 2995/0026* (2013.01); *B29K 2995/004* (2013.01); *B29K 2995/0041* (2013.01); *B29L 2031/7158* (2013.01)

(56) References Cited

U.S. PATENT DOCUMENTS

| | | | |
|---|---|---|---|
| 5,614,718 A | 3/1997 | Brace | |
| 5,730,298 A | 3/1998 | Gernet et al. | |
| 5,735,420 A | 4/1998 | Nakamaki | |
| 6,185,477 B1 | 2/2001 | Palm et al. | |
| 7,924,421 B2 | 4/2011 | Schmidt et al. | |
| 9,346,213 B2 | 5/2016 | Haner et al. | |
| 9,539,756 B2 | 1/2017 | Wolfe et al. | |
| 9,868,247 B2 | 1/2018 | Wolfe et al. | |
| 10,183,440 B2 | 1/2019 | Wolfe et al. | |
| 11,155,018 B2 | 10/2021 | Wolfe et al. | |
| 2002/0014708 A1 | 2/2002 | Lullwitz et al. | |
| 2002/0033943 A1 | 3/2002 | Clauberg et al. | |
| 2005/0173844 A1* | 8/2005 | Vermeersch | B29C 45/0001 264/537 |
| 2006/0212161 A1* | 9/2006 | Bhat | B29C 49/78 700/197 |
| 2006/0214321 A1* | 9/2006 | Semersky | B29C 49/78 425/141 |
| 2007/0149754 A1 | 6/2007 | Bayer | |
| 2008/0211125 A1 | 9/2008 | Derrien et al. | |
| 2008/0230954 A1 | 9/2008 | Gruber et al. | |
| 2009/0147082 A1 | 6/2009 | Detrois et al. | |
| 2009/0278286 A1 | 11/2009 | Schmidt et al. | |
| 2010/0221470 A1 | 9/2010 | Derrien | |
| 2010/0279087 A1 | 11/2010 | Tokiwa | |
| 2011/0024952 A1* | 2/2011 | Stoiber | B29C 49/42 425/526 |
| 2011/0180509 A1 | 7/2011 | Hutchinson et al. | |
| 2011/0260350 A1 | 10/2011 | Haesendonckx et al. | |
| 2012/0007289 A1* | 1/2012 | O'Connell | B29C 49/78 264/406 |
| 2012/0130677 A1 | 5/2012 | Wolfe et al. | |
| 2019/0061225 A1 | 2/2019 | Pasquier et al. | |

FOREIGN PATENT DOCUMENTS

| | | |
|---|---|---|
| DE | 102010022405 A1 | 12/2011 |
| DE | 102012102356 A1 | 9/2013 |
| EP | 0681902 A1 | 11/1995 |
| EP | 1175990 A1 | 1/2002 |
| JP | 2007315794 | 12/2007 |
| JP | 2013107310 | 6/2013 |
| JP | 2013139548 | 7/2013 |
| WO | 2010110420 A1 | 9/2010 |

\* cited by examiner

BLOW MOLDER CONTROL SYSTEMS AND METHODS

PRIORITY CLAIM

The present application is a continuation of U.S. patent application Ser. No. 18/049,656, filed Oct. 26, 2022, which is a continuation of U.S. patent application Ser. No. 17/495,421, filed Oct. 6, 2021, which is a continuation of U.S. patent application Ser. No. 16/245,805, filed Jan. 11, 2019, which is a continuation of U.S. patent application Ser. No. 15/840,774, filed Dec. 13, 2017, now U.S. Pat. No. 10,183,440, issued on Jan. 22, 2019, which is a continuation of U.S. patent application Ser. No. 15/367,392, filed Dec. 2, 2016, now U.S. Pat. No. 9,868,247, issued Jan. 16, 2018, which is a continuation of U.S. patent application Ser. No. 14/652,383, filed Jun. 15, 2015, now U.S. Pat. No. 9,539,756, issued Jan. 10, 2017, which is a National Stage of International Application Serial No. PCT/US2014/050734, filed Aug. 12, 2014, which claims the benefit of U.S. provisional patent application Ser. No. 61/864,905, filed Aug. 12, 2013, which are all incorporated herein by reference in their entirety.

BACKGROUND

Polyethylene terephthalate (PET) and other types of plastic containers are commonly produced utilizing a machine referred to as a reheat, stretch and blow molder. The blow molder receives preforms and outputs containers. When a preform is received into a blow molder, it is initially heated and placed into a mold. A rod stretches the preform while air is being blown into the preform causing it to stretch axially and circumferentially, and take the shape of the mold. A typical reheat, stretch and blow molder has between ten (10) and forty-eight (48) or more molds. This increases the product rate of the blow molder, but also increases the rate at which defective containers can be generated when there is a problem with one or more blow molding process parameters. Accordingly, container manufacturers are keen to detect and correct blow molding process problems as efficiently as possible.

In the course of manufacturing blow-molded containers, it is desirable to control the blow molder to achieve desired container properties including, desired container dimensions, material distribution, strength, the absence of defects, etc. This is typically accomplished manually. According to one common technique, an operator of the blow molder ejects a set of completed containers for off-line inspection. Various types of off-line inspections are used to measure different aspects of the container. Material or thickness distribution is often measured using a qualitative "squeeze" test and/or a quantitative section weight test. In a squeeze test, the operator, or other testing personnel, squeezes the container to obtain a qualitative indication of whether there is sufficient material at key locations of the container. In a section weight test, the container is physically divided into circumferential sections. Each section is individually weighted, yielding the section weights. Other common off-line inspections include top load and burst pressure tests to measure container strength, volumetric fill height and base clearance tests to measure container size and shape, etc. Based on the qualitative and quantitative results of tests such as these, the operator modifies input parameters of the blow molder to move material to the appropriate locations within the bottle.

Manual measurement and adjustment techniques, however, suffer from several disadvantages. The qualitative nature of some of the tests makes it difficult to maintain consistent results from one tester to another. For example, different operators may interpret the same material distribution differently during a squeeze test. Also, even when using a rig, it is difficult to precisely replicate section cuts across multiple container samples, reducing the accuracy of manually obtained section weights. Further, it is very difficult for operators to consistently tune the blow molder to obtain the desired material distribution. The correlations between blow molder input parameters and output material distribution are very complex. Different blow molder operators have differing levels of understanding of these parameters and, therefore, differing abilities to obtain desired container distributions. As a result, many operators simply avoid modifying blow molder input parameters unless the containers are outside of design tolerances, even if an alternative material distribution would be desirable.

Early on-line inspection systems, such as the Intellispec™ product, available from Pressco Technology Inc. of Cleveland Ohio and the PET-View product, available from the Krones Group of Neutraubling, Germany, utilize computer vision to inspect containers either in or downstream of the blow molder and reject mal-formed containers. These systems improve the quality of the container production by removing containers with randomly occurring damage, inclusions, and grossly formed containers, but have limited success addressing process related issues that drive container quality and performance.

Subsequent inspection devices have allowed more detailed inspections to detect more subtle system properties. For example, the various infrared absorption measurement devices available from AGR International of Butler, Pennsylvania, are capable of measuring the material distribution of individual containers. The measurements are made using a series of emitters and sensors that are located either within or downstream of the blow molder. The sensors are oriented towards the sidewalls of the containers and generate measurements on the containers at 12.5 mm intervals, thus providing a profile of material distribution in the container sidewalls. Measurements from devices such as the AGR infrared absorption measurement devices obviate the need to conduct squeeze and section weight tests while, at the same time, providing more repeatable results. Also, advanced vision systems, such as the Pilot Vision™ system, also available from AGR International, Inc. of Butler, Pennsylvania, provide increased resolution and are able to detect more subtle container defects.

Recent advances in blow molder technology have allowed for some degree of automated process control in blow molders. For example, many current blow molders have mechanical mold controls that may be operated utilizing servo motors and other smart technology. Oven designs and control improvements have also improved. Also, recently the Sidel S.A.S. Company of Le Havre, France, has introduced a blow molder with a mold control loop that to accommodate variations in the temperature of performs arriving at the mold. The mold control loop controls the pre-blow start and pre-blow pressure to detect changes in preform properties and adapts the pre-blow pressure profile to account for any variations in preform energy or energy distribution.

Another process control system is the Process Pilot® product, available from AGR International, Inc. of Butler, Pennsylvania. The Process Pilot® product is a closed loop control system used to manage the re-heat stretch and blow molding process. An infrared absorption-type measurement system is used to generate a material distribution profile, as described above. The Process Pilot® product learns the relationship between the container blowing process and the location of the material in the container with a series of automated measurements made in conjunction with adjustments to the blow molder input parameters. This information forms the basis for future adjustments to the blow molder. A custom equation is used to express the relationship between blow molder input parameters and resulting material distributions. A control loop is implemented by establishing a baseline material distribution and baseline values for the various blow molder inputs. As the material distribution drifts during the blow molding process, relationship between the blow molder input parameters and container characteristics is utilized in conjunction with additional mathematics to determine blow molder parameter values that minimize the difference between the baseline and the measured material distribution while also minimizing control changes relative to baseline blow molder input parameters. The Process Pilot® product can be operated continuously to minimize the overall process variation.

Current blow molder process control systems represent an improvement over the prior off-line and often manual methods. Additional challenges remain, however. For example, current control systems described above do not consider container properties such as crystallinity or material density, base sag, various container dimensions, etc. These and other properties, which can have a significant effect on overall container quality, must still be managed with manual off-line tests and manual adjustments to blow molder input parameters. Improved process control systems for blow molders are needed.

FIGURES

Various embodiments are described herein by way of example in conjunction with the following figures, wherein.

DESCRIPTION

Figure 1:
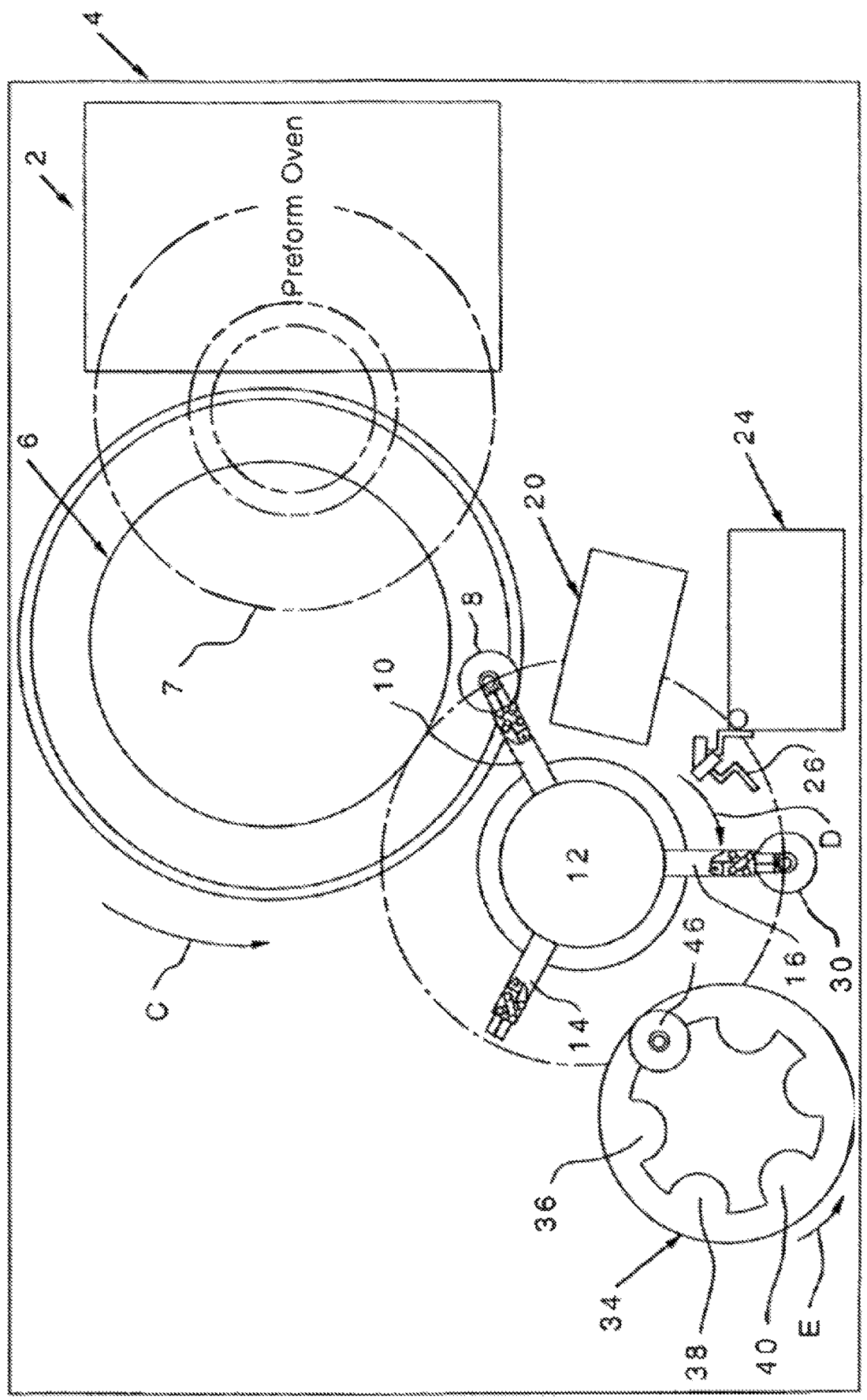
FIG. 1 is a block diagram showing one embodiment of a blow molder system.

Various embodiments described herein are directed to systems and methods for controlling blow molder input parameters to optimize container characteristics such as, for example, crystallinity, base sag, and various container dimensions. Existing blow molder process control systems, such as the Process Pilot® product described above, are capable of optimizing the material distribution of containers. There is a need, however, for systems and methods for also optimizing other container properties such as those referenced above.

Crystallinity in a PET container describes degree of orientation in the PET molecules for that container. Crystallinity in typical PET containers ranges from ~20% to ~40%, depending on the type of container. The degree of crystallinity in a container affects many other quality-related characteristics of a container including its structural strength including top load performance, clarity (e.g., haze or pearlescence), permeability, etc. Therefore, optimizing crystallinity may also effectively optimize crystallinity-related characteristics. Crystallinity may be created and optimized differently based on the type of blow molding process utilized (e.g., a cold mold process or a hot mold process).

In a cold mold process, bi-axial crystallinity is induced by mechanical stretching and blowing, also referred to as strain hardening. In such a configuration, the preform is heated prior to reaching the mold. At the mold, a stretch rod and compressed air are utilized to expand the preform within the mold. The mold itself is typically cooled, for example, with chilled water or another cooled fluid. The stretching process increases the crystallinity of the PET molecules, but also creates residual stresses in the containers. The residual stresses are substantially set by contact with the cold mold. For cold mold-generated containers, crystallinity is also sometimes referred to as orientation. The crystallinity or orientation of a cold mold-generated container describes a degree to which molecules of the container are organized according to the bi-axial lattice structure. For example, the crystallinity or orientation of a cold mold-generated container may indicate a portion or percentage of the molecules in the container that are part of a bi-axial lattice structure.

Examples of containers generated utilizing cold mold processes include water bottles and carbonated soft drink (CSD) containers. CSD bottles typically have a higher level of mechanically induced crystallinity or orientation to provide greater container performance. Under ordinary conditions, the level of crystallinity or orientation in cold mold processes can be managed by manipulating the temperature of preforms at the exit of the oven. When a preform has the proper overall temperature or energy and energy distribution prior to blowing, the re-heat stretch and blow process can be optimized to generate desired levels of crystallinity or orientation. However, if the preform energy or energy distribution varies, unwanted results can occur. For example, when the preform is too cold, pearlescence can occur. Pearlescence manifests as a white chalky substance primarily on the inner portions of the container in regions where the greatest stretching occurs. For example, pearlescence may occur when bi-axial lattice structures for the claim break. According to various embodiments, optimal levels of crystallinity or orientation are obtained by lowering the energy in the preform to just above the point where the pearlescence is seen after the stretching process.

In a hot mold process, the molds of the blow molder are heated, often by hot oil or another heated fluid that is circulated through the molds. Hot mold-generated containers exhibit spherulitic crystallinity. A measure of crystallinity in a hot mold-generated container, for example, may indicate a degree to which molecules of the container are organized according to spherulite crystal structures. For example, the crystallinity of a hot mold generated container may indicate portion or percentage of molecules in the container that are part of spherulite structures. In a hot mold process, container crystallinity is created and preserved by both mechanical and thermal forces. Hot mold processes generally result in higher crystallinity and therefore superior and more stable container characteristics. For example, the heat of the mold causes spherulitic crystallization and also anneals the container, which releases residual stresses that could cause later deformation. In addition, the higher temperature levels can provide a greater mold fill factor for heat set and non-carbonated soft drinks. Because the hot mold process releases rather than sets residual stresses, hot mold generated containers often hold their shape better than cold molded containers, making their properties more durable and more suitable for hot liquids. As with cold mold processes, crystallinity in hot mold processes can be managed by controlling the preform temperature, either as set by the ovens or by the hot mold itself. Higher preform energy generally leads to higher container crystallinity and, therefore, a higher top load, better volumetric fill, etc. If preform energy is too high, however, thermal hazing can occur. Thermal hazing, or just hazing, manifests as a cloudy form, called haze, which presents in a PET container. Hazing is caused when the combination of preform and mold temperature is high enough to generate excess spherulitic crystallization, leading to light scattering and eventually opacity. Haze affects the aesthetic properties of the container and may also indicate brittleness. In a hot mold process, it is often optimal to achieve a degree of crystallinity that is close to, but less than the level corresponding to the onset of thermal hazing. Therefore, in various embodiments, optimal crystallinity may be achieved by increasing the energy in the preform to just below the onset of thermal hazing.

As used herein, the term crystallinity refers both cold mold-generated containers and hot mold-generated containers. For example, when referring to a cold mold-generated container, the term crystallinity may refer to the orientation or degree of bi-axial lattice structuring. Also, for example, when referring to a hot mold-generated container, the term crystallinity may refer to the degree of spherulite structuring.

Base sag is another container property that can become problematic, especially but not exclusively in cold mold processing. It is believed that base sag is correlated with container stress cracking. Stress cracking is a particular problem for carbonated soft drink (CSD) containers, and often in the containers' petaloid bases. Stress cracking is believed to be caused by contact between containers and certain chemicals during the handling and storage that occurs after filling. Minimizing or eliminating base sag may reduce the container area that is in contact with the container's resting surface and thereby minimize contact with potentially harmful chemistry.

Container dimensions are also affected by the blow molding process and cannot be adequately controlled with current process control systems. The need to optimize container dimensions may be particularly relevant when utilizing a "blow and trim" process. According to a blow and trim process, the finish of the container is formed within the mold itself. This means that the mold fill factor (e.g., the degree to which the container fills out the mold) determines the correct formation of the finish, including threads that must interface with a separately manufactured cap. Examples of the blow and trim process are provided in U.S. Pat. No. 7,455,914, which is incorporated herein by reference in its entirety.

The blow molder process control systems and methods described herein are directed to controlling blow molder input parameters to optimize container characteristics including, for example, crystallinity, orientation, base sag, and/or various container dimensions. In various embodiments, a blow molder control system is in communication with a blow molder as well as with one or more inspection systems for measuring characteristics of containers generated by the blow molder. The inspection systems may include various vision systems for capturing images of the different portions of the container, a temperature sensor for sensing the temperature of various portions of the container, and/or a material distribution system, such as the infrared absorption measurement devices described above, for measuring a distribution of material within the container.

In a cold mold process, the container crystallinity may be managed by modifying the preform temperature set point. For example, a vision system may capture images of containers generated by the blow molder. The vision system and/or the control system may process the images to determine whether pearlescence is present. If pearlescence is present, the control system may increase the preform temperature set point. For example, the control system may incrementally increase the preform temperature set point until pearlescence is no longer present in the generated containers. Also, in some embodiments, crystallinity may be measured directly in addition to or instead of measuring the presence and/or quantity of pearlescence. For example, crystallinity may be directly measured utilizing a birefringence method, X-ray diffraction, Raman spectroscopy, near infrared (NIR) absorption spectroscopy, etc. When crystallinity in a cold mold process is measured directly, the control system may modify the preform temperature set point and/or other blow molder inputs to drive the crystallinity to a desired value and/or range of values.

In various embodiments, the control system, operating with a cold mold process, may also consider a temperature of the produced container. This temperature may be measured on any suitable portion of the bottle, such as, for example, a base temperature. Also, in some embodiments, container temperature is indirectly monitored based on a temperature of the mold. The temperature may be received from the temperature sensor. In some embodiments, the control system responds to changes in the container temperature by making corresponding changes to the preform temperature set point. Also, in various embodiments, the control system is programmed to execute a control sequence for reorienting the process at or near the optimal crystallinity. For example, the control system may begin to decrease the preform temperature set point until pearlescence is detected, and subsequently increase the preform temperature set point until pearlescence is no longer present. This may ensure that the blow molder generates containers at or close to the optimal cold mold crystallinity. The reorienting control sequence may be executed, for example, at the initiation of the process and/or at upon detection of a change in container temperature (e.g., an increase in container temperature). A reorienting control sequence may also be utilized in embodiments where crystallinity is measured directly. For example, the control system may decrease the preform temperature set point until a predetermined crystallinity is reached. The predetermined crystallinity may be associated with the onset of pearlescence or, in some embodiments, may indicate the container is near a threshold crystallinity where pearlescence occurs. Subsequently, the preform temperature set point may be increased, for example, by a predetermined temperature increment, until a desired crystallinity reading is achieved, until crystallinity falls by a predetermined amount, etc.

In a hot mold process, the container crystallinity may be managed, again by modifying the preform temperature set point and/or modifying the temperature of the mold, where such modifications are allowed by the blow molder. Again, a vision system captures images of containers generated by the blow molder. The vision system and/or control system processes the images to determine whether thermal hazing (e.g., "haze") is present. When haze is detected, the control system may decrease the preform temperature set point. In various embodiments, the control system incrementally decreases the preform temperature set point until haze is no longer present in the generated containers. If the mold temperature is separately controllable, then the mold temperature may be modified in addition to or instead of modifying the preform temperature set point. It will be appreciated that, when the systems and methods described herein are utilized in conjunction with a blow molder that allows for control of the mold temperature, changes described as being to preform temperature set may be equivalently implemented by changes to the mold temperature and/or changes to combinations of blow molder input parameters including the mold temperature and the preform temperature set point.

Also in a hot mold process, crystallinity may be measured directly in addition to or instead of measuring the presence or amount of haze. For example, the control system may modify the preform temperature set point and/or mold temperature to drive the crystallinity of the containers to a desired value or range of values.

In various embodiments, the control system, operating in a hot mold process, may also utilize a measurement of container temperature or mold temperature to detect process drift. The container temperature may be taken at any portion of the container including, for example, a sidewall. The measurements may be made by a separate temperature sensor in communication with the control system and/or may be received directly from the blow molder. As in the cold mold process, the control system may modulate the preform temperature set point up or down to correspond to changes in the container temperature. In some embodiments, the control system may also execute a reorienting control sequence to place the process at or near the optimal hot mold crystallinity. For example, the control system may either allow or deliberately cause the container temperature to rise until the onset of haze, and subsequently reduce the preform temperature set point until haze is no longer present. This may ensure that the blow molder generates containers at or close to the optimal hot mold crystallinity. The reorienting control sequence may be executed at the initiation of the process, upon detection of an increase or decrease in container temperature, etc.

A reorienting control sequence may also be utilized in embodiments where crystallinity is measured directly. For example, the control system may allow or cause the container temperature to rise until a predetermined crystallinity is reached. The predetermined crystallinity may be associated with the onset of haze or, in some embodiments, may indicate that the container is very near a threshold crystallinity where haze occurs. Subsequently, the preform temperature set point may be decreased, for example, by a predetermined temperature increment, until a desired crystallinity reading is achieved, until crystallinity falls by a predetermined amount, etc.

In various embodiments, such as those utilizing a hot mold process, the crystallinity of generated containers may be derived from measuring a temperature of the mold. For example, changes in the temperature of the mold may indicate corresponding changes to the crystallinity of produced containers. The temperature of the mold may be measured by a temperature sensor with results provided to the control system. The control system may compensate for mold temperature changes by adjusting the preform temperature set point to maintain the desired crystallinity level.

In various embodiments, base sag may be optimized by correcting for excessive material and/or temperature in the base. For example, a blown container base with either too much energy or material can cause the base to sag putting this container at higher risk of contact with undesirable chemical reagents. In various embodiments, the control system may periodically measure the base clearance of produced containers to determine if the process is creating containers that will sag. Base clearance may be measured, for example, by a vision system positioned to capture images of the container base. When insufficient base clearance is detected, the control system may adjust (e.g., decrease) the preform temperature set point to compensate. In some embodiments (e.g., embodiments utilizing a cold mold process), the control system may modify a temperature of a base cup portion of the mold in addition to or instead of modifying the preform temperature set point. As described herein, this may serve to mitigate some of the risk of stress cracking. Also, in various embodiments, the control system may periodically measure a temperature of the bases of produced containers, for example, based on a signal from a temperature sensor. If the temperature exceeds a threshold, then the preform temperature set point may be reduced. For example, if the base has too much material, the time in the mold may be insufficient to cool the base to the point where it will not sag. Likewise if the mold base cup is too warm even the correct amount of material in the base will have a tendency to sag.

The control system may similarly control the blow molder in both hot and cold mold processes to optimize container dimensions, such as finish dimensions. For example, container dimensions may be determined by the degree to which the preform conforms to the shape of the mold during the blowing process (e.g., the "fill-factor"). If the preform does not contain enough energy (e.g., is not hot enough), then it may not completely fill the mold, leading to a container with smaller-than-desired dimensions. Accordingly, one or more of the various vision systems may capture images of the generated containers. The vision systems and/or the control system may derive from the images dimensions of the generated containers. If the dimensions are less than a threshold, then the control system may increase the preform temperature set point.

As described herein, the crystallinity, base sag and various container dimensions may be controlled by adjusting the temperature of preforms during the molding process, either by modifying the blow molders preform temperature set point or, where supported, by modifying the temperature of all or a part of the mold. Modifying the mold temperature and/or preform temperature set point in isolation, however, can cause significant and often undesired changes in material distribution. Therefore, various embodiments of the systems and methods described herein are implemented in conjunction with a material distribution control loop for monitoring material distribution. In some embodiments, a preform temperature control loop for controlling the preform temperature set point or mold temperature is executed in conjunction with the material distribution control loop. The separate control loops may control different subsets of the blow molder input parameters. For example, the preform temperature control loop may control the preform temperature set point and/or the mold temperature. The material thickness control may control other blow molder input parameters excluding those controlled by the preform temperature control loop (e.g. oven lamp settings, pre-blow timing, pre-blow pressure, high pressure blow timing, high pressure blow pressure, etc.). Also, in some embodiments, the control system may implement a single control loop for controlling all blow molder parameters, including the preform temperature set point, as described herein to manage crystallinity, base sag, and/or container dimensions.

Before describing the control systems and methods in more detail, an overview of a blow molder system is provided. FIG. 1 is a block diagram showing one embodiment of a blow molder system 4 according to various embodiments. The blow molder system 4 includes a preform oven 2 that typically carries the plastic preforms on spindles through the oven section so as to preheat the preforms prior to blow-molding of the containers. The preform oven 2 may comprise, for example, infrared heating lamps or other heating elements to heat the preforms above their glass transition temperature. Many blow molders 6 utilize preform ovens defining multiple heating elements positioned to heat different portions of the preforms. The preforms leaving the preform oven 2 may enter the blow molder 6 by means, for example, of a conventional transfer system 7 (shown in phantom).

The blow molder 6 may comprise a number of molds, such as on the order of ten to twenty-four, for example, arranged in a circle and rotating in a direction indicated by the arrow C. The preforms may be stretched in the blow molder 6, using air and/or a core rod, to conform the preform to the shape defined by the mold. In many blow molders 6, an initial pre-blow is utilized to begin the container formation process followed by a high-pressure blow to push the now-stretched walls of the preform against the mold. Depending on the type of container to be generated, the molds may be heated (a hot mold process) or cooled (a cold mold process). Containers emerging from the blow molder 6, such as container 8, may be suspended from a transfer arm 10 on a transfer assembly 12, which is rotating in the direction indicated by arrow D. Similarly, transfer arms 14 and 16 may, as the transfer assembly 12 rotates, pick up the container 8 and transport the container through the inspection area 20, where it may be inspected by one or more of the inspection systems described below. A reject area 24 has a reject mechanism 26 that may physically remove from the transfer assembly 12 any containers deemed to be rejected. In some embodiments, the blow molder system 4 may include alternate inspection areas.

In the example of FIG. 1, container 30 has passed beyond the reject area 24 and may be picked up in a star wheel mechanism 34, which is rotating in direction E and has a plurality of pockets, such as pockets 36, 38, 40, for example. A container 46 is shown in FIG. 1 as being present in such a star wheel pocket. The containers may then be transferred in a manner known to those skilled in the art to a conveyer or other transport mechanism according to the desired transport path and nature of the system. It will be appreciated that the blow molder system 4 may comprise one or more inspection areas in addition to or instead of the inspection area 20. For example, alternate inspection areas may be created by adding additional transfer assemblies, such as transport assembly 12. Also, alternate inspection areas may be positioned on a conveyor or other position down-line from the blow molder 6.

The blow molder system 4 may produce containers at a rate of 20,000 to 120,000 per hour, though manufacturers continue to develop blow molders with increasing speed and in some embodiments it may be desirable to run the blow molder system 4 at lower rates. The blow molder system 4 receives various inputs parameters that affect the characteristics of the generated containers. For example, the preform oven 2 may receive an overall temperature input parameter, referred to as a preform temperature set point, as well as additional input parameters that define the distribution of heat between the individual heating elements. Other controllable parameters include, for example, a pre-blow timing, a pre-blow pressure, etc.

Figure 2:
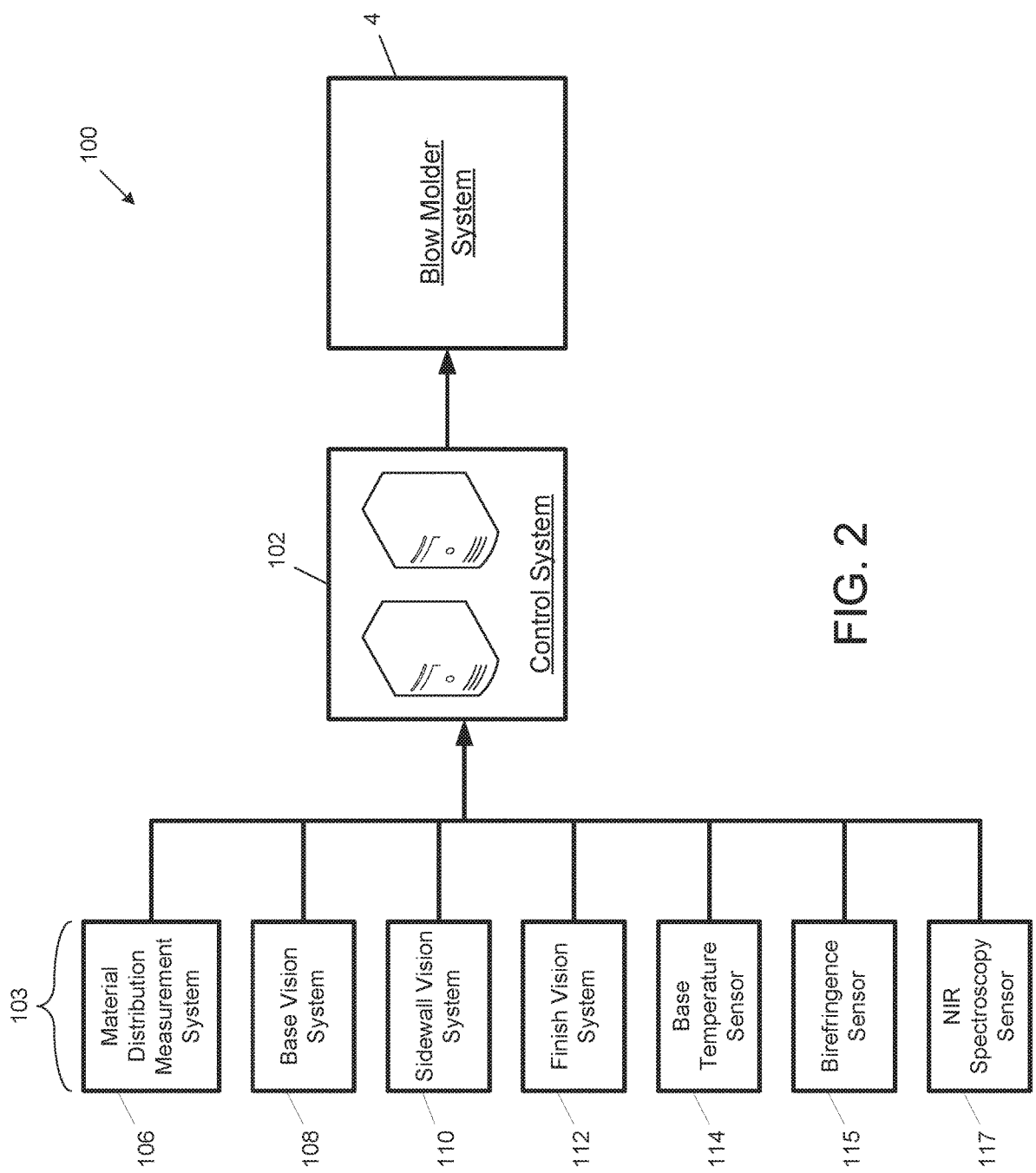
FIG. 2 is a block diagram of one embodiment of a blow molder control system.

FIG. 2 is a block diagram of one embodiment of a blow molder control system 100. The system 100 comprises the blow molder system 4, a control system 102, and various inspection systems 103. The inspection systems 103 are positioned to sense characteristics of containers produced by the blow molders. The inspection systems 103 may be placed in-line to sense characteristics of the containers as they are produced by the blow molder system 4. The control system 102 may comprise one or more servers or other computer devices. The control system 102 receives signals from the various inspection systems 103 indicating container characteristics and generates blow molder input parameters or changes thereto to cause the blow molder system 4 to generate containers within desired tolerances, as described herein below.

Various different types of inspection systems 103 may be used. For example, a material distribution system 106 may measure a material distribution profile of the container. According to various embodiments, the material distribution system 106 finds the material distribution of containers after formation (e.g., either in or downstream of the blow molder system 4). For example, the material distribution system 106 may be used to take multiple direct or indirect readings of one or more container characteristics across a profile (e.g., a vertical profile) of the container. The container characteristics may comprise, for example, wall thickness (e.g., average 2-wall thickness), mass, volume, etc. Material distribution may be derived from any of these measurements. The system 106 may utilize measured container characteristics found across the profile of the container to derive a material distribution of the container. In some, but not all, embodiments, the measurements, and therefore the calculated material distribution, need only be taken across the oriented or stretched parts of the container and may exclude non-oriented portions of the container such as, for example, a finish area, a base cup, etc. Calculations for converting raw measurements to a material distribution may be performed by on-board computing equipment associated with the system 106 and/or by the control system 102.

Figure 3:
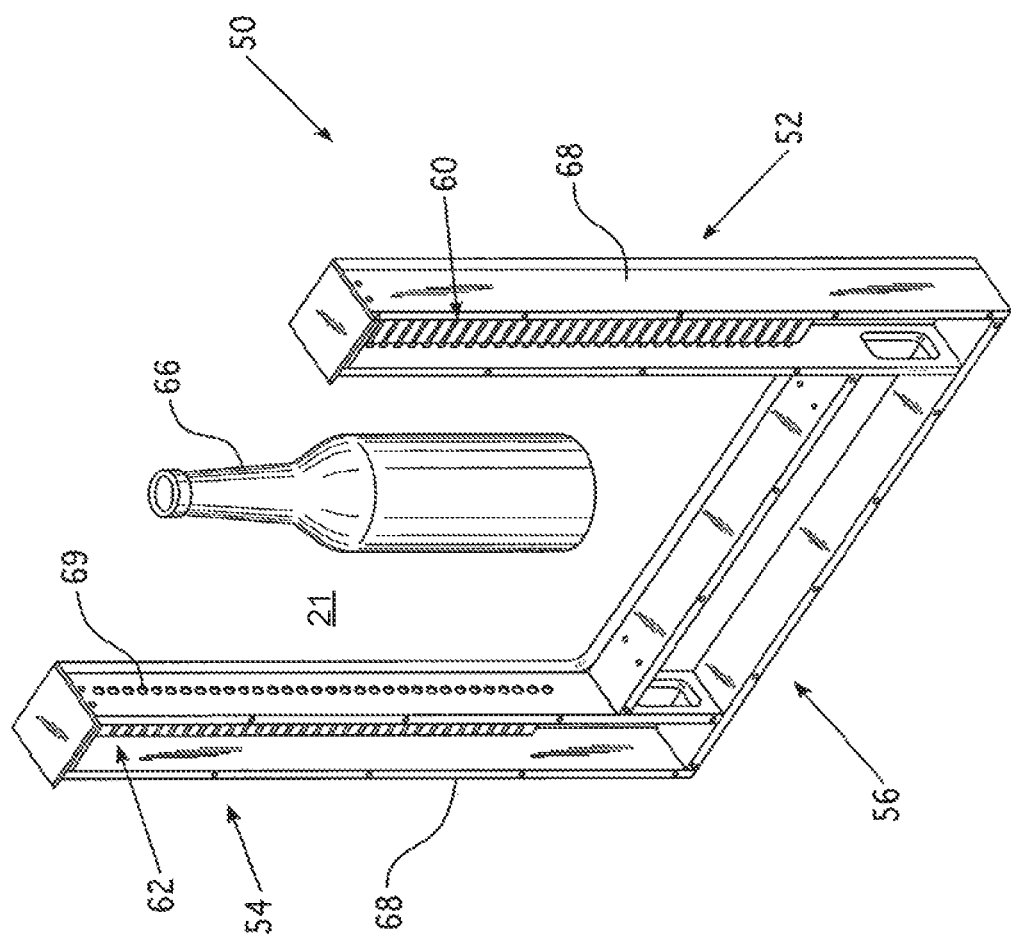
FIG. 3 illustrates one embodiment of a material distribution measuring device that may be associated with the material distribution system.

The material distribution system 106 may utilize any suitable type of measurement device capable of measuring a material distribution profile. For example, FIG. 3 illustrates one embodiment of a measuring device 50 that may be associated with the material distribution system 106. The measuring device 50, may be an in-line inspection system that inspects the containers as they are formed, as fast as they are formed, without having to remove the containers from the processing line for inspection and without having to destroy the container for inspection. The inspection system 50 may determine characteristics of each container formed by the blow molder system 4 (e.g., average 2-wall thickness, mass, volume, and/or material distribution) as the formed containers are rotated or otherwise transported through an inspection area 21 following blow molding. The inspection area 21 may be positioned similar to the example inspection area 20 shown in FIG. 1 and/or at any other suitable in-line location, for example, as described above. Following blow molding, containers, such as the container 66, are passed through the inspection area 21 by any suitable mechanism such as, for example, a transfer assembly such as the transfer assembly 12, a conveyor, etc.

As shown in these FIG. 3, the inspection system 50 may comprise two vertical arms 52, 54, with a cross bar section 56 there between at the lower portion of the arms 52, 54. One of the arms 52 may comprise a number of light energy emitter assemblies 60, and the other arm 54 may comprise a number of broadband sensors 62 for detecting light energy from the emitter assemblies 60 that passes through a plastic container 66 passing between the arms 52, 54. Thus, light energy from the emitter assembly 60 that is not absorbed by the container 66 may pass through the two opposite sidewalls of the container 66 and be sensed by the sensors 62. The container 66 may be rotated through the inspection area 20 between the arms 52, 54 by the transfer assembly 12 (see FIG. 1). In other embodiments, a conveyor may be used to transport the containers through the inspection area 20.

According to various embodiments, the emitter assemblies 60 comprises a pair of light emitting diodes (LED's), laser diodes, etc., that emit light energy at different, discrete narrow wavelengths bands. For example, one LED in each emitter assembly 60 may emit light energy in a narrow band wavelength range where the absorption characteristics of the material of the container are highly dependent on the thickness of the material of the plastic container 66 ("the absorption wavelength"). The other LED may emit light energy in a narrow band wavelength that is substantially transmissive ("the reference wavelength") by the material of the plastic container 66. According to various embodiments, there may be one broadband sensor 62 in the arm 54 for each emitter 60 in the arm 52. Based on the sensed energy at both the absorption and reference wavelengths, the thickness through two walls of the container 66 can be determined at the height level of the emitter-sensor pair. This information can be used in determining whether to reject a container because its walls do not meet specification (e.g., the walls are either too thin or too thick). This information can also be used as feedback for adjusting parameters of the preform oven 2 and/or the blow molder 6 (FIG. 1) according to various embodiments, as described further below.

The more closely the emitter-sensor pairs are spaced vertically, the more detailed thickness information can be obtained regarding the container 66. According to various embodiments, there may be between three (3) and fifty (50) such emitter-sensor pairs spanning the height of the container 66 from top to bottom. For example, there may be thirty two emitter-sensor pairs spaced every 0.5 inches or less, although additional emitter-sensor pairs may be used, depending on the circumstances. Such closely spaced emitter-sensor pairs can effectively provide a rather complete vertical wall thickness profile for the container 66. In some embodiments with closely spaced emitter-sensor pairs, adjacent emitter-sensor pairs may be configured to operate at a small time offset relative to one another so as to minimize cross-talk.

According to various embodiments, when the inspection system 50 is used to inspect plastic or PET containers 66, the absorption wavelength narrow band may be around 2350 nm, and the reference wavelength band may be around 1835 nm. Of course, in other embodiments, different wavelength bands may be used. As used herein, the terms "narrow band" or "narrow wavelength band" means a wavelength band that is less than or equal to 200 nm full width at half maximum (FWHM). That is, the difference between the wavelengths at which the emission intensity of one of the light sources is half its maximum intensity is less than or equal to 200 nm. Preferably, the light sources have narrow bands that are 100 nm or less FWHM, and preferably are 50 nm or less FWHM.

The arms 52, 54 may comprise a frame 68 to which the emitter assemblies 60 and sensors 62 are mounted. The frame 68 may be made of any suitable material such as, for example, aluminum. Controllers on circuit boards (not shown) for controlling/powering the emitter 60 and sensors 62 may also be disposed in the open spaces defined by the frame 68. The crossbar section 56 may be made out of the same material as the frame 68 for the arms 52, 54.

The frame 68 may define a number of openings 69 aimed at the inspection area 20. As shown in FIG. 2, there may be an opening for each sensor 62. There may also be a corresponding opening for each emitter assembly 60. Light energy from the emitter assemblies may be directed through their corresponding opening into the inspection area 20 and toward the sensors 62 behind each opening 69. One example of a system such as that described above is set forth in U.S. Pat. No. 7,924,421 filed on Aug. 31, 2007 and incorporated herein by reference in its entirety.

Another type of measuring device that may be used utilizes a broadband light source, a chopper wheel, and a spectrometer to measure the wall thickness of the container as it passes through an inspection area between the light source and the spectrometer after being formed by a blow molder. The broadband light source in such a system may provide chopped IR light energy that impinges the surface of the plastic container, travels through both walls of the container, and is sensed by the spectrometer to determine absorption levels in the plastic at discrete wavelengths. This information may be used, for example, by a processor, to determine characteristics of the plastic bottle, such as wall thickness, material distribution, etc. In practice, such systems may use a thermal source to generate broadband light within the visible and infrared spectrums of interest. The broadband light is chopped, collimated, transmitted through two walls of the plastic container, and finally divided into wavelengths of interest by the spectroscope. Examples of similar systems are provided in U.S. Pat. No. 6,863,860, filed on Mar. 26, 2002, U.S. Pat. No. 7,378,047, filed on Jan. 24, 2005, U.S. Pat. No. 7,374,713, filed on Oct. 5, 2006, and U.S. Pat. No. 7,780,898, filed Apr. 21, 2008, all of which are incorporated herein by reference in their entireties.

In various embodiments, the inspection systems 103 may also include various vision and other systems including, for example, a base vision system 108, a sidewall vision system 110 a finish vision system 112, a base temperature sensor 114. Optionally, the inspection systems 103 may also include sensor systems for directly measuring crystallinity. For example, a birefringence sensor 115 may measure crystallinity in cold mold-generated containers. In A near infrared (NIR) spectroscopy sensor may measure crystallinity in hold mold-generated containers. Any or all of the various inspection systems 103 may be configured to operate in-line and inspect the containers as they are formed, as fast as they are formed, without having to remove the containers from the processing line for inspection and without having to destroy the container for inspection.

Figure 4:
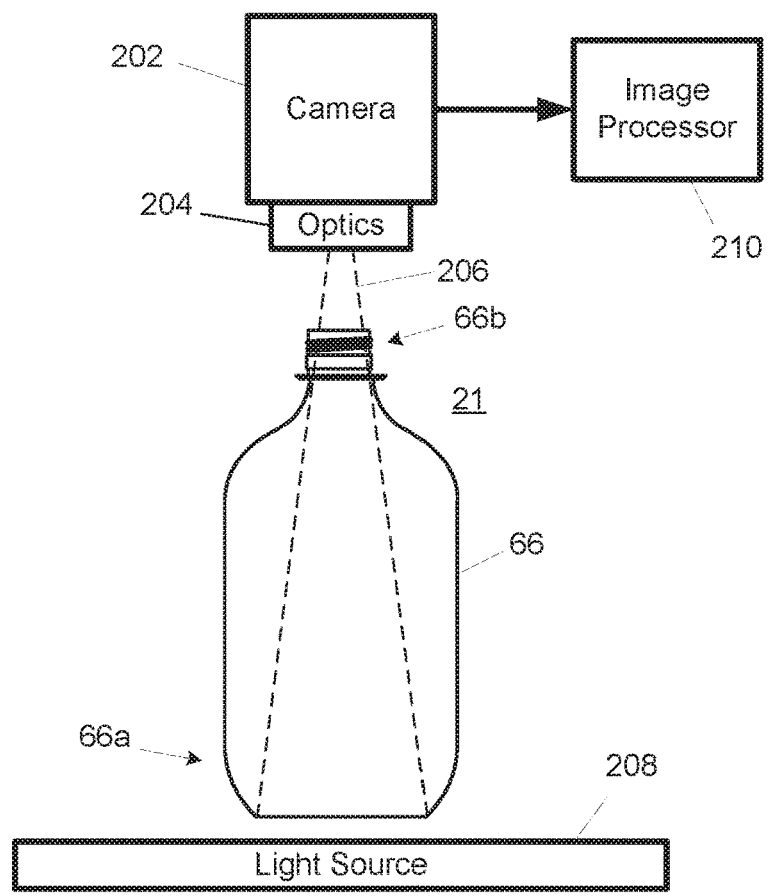
FIG. 4 is a block diagram showing one embodiment of a base vision system.

The vision system or systems may be similar to the vision system used in the infrared absorption measurement devices available from AGR International, Inc. of Butler, Pennsylvania, or as described in U.S. Pat. No. 6,967,716, filed on Apr. 21, 2000 which is incorporated herein by reference. FIG. 4 is a block diagram showing one embodiment of a base vision system 108. The system 108 comprises a camera 202, optics 204, a light source 208 and an optional image processor 210. Images may be taken while the container 66 is in the inspection area 21, which may be positioned between the light source 208 and the camera 202. Resulting images may be useful, as described herein below, for determining the presence of haze or pearlescence. Images from the camera 202 may be provided to an image processor 210, which may perform various pre-processing and/or evaluate the images to determine properties of the container 66 such as, clarity status (e.g., haze or pearlescence status), (various container dimensions, etc.). In some embodiments, the image processor 210 is omitted and image processing is performed by the control system 102. In the embodiment shown in FIG. 4, the camera 202 and optics 204 are positioned above the container 66. The optics 204 may include various lenses or other optical components configured to give the camera 202 an appropriate field of view 206 to sense the base area 66a of the container 66 through the finish 66b. It will be appreciated that other configurations of the base vision system 108 are also possible. In some embodiments, the positions of the camera/optics 202/204 and light source 208 may be reversed. Also, in some embodiments, additional cameras (not shown) having additional fields of view may be utilized.

Figure 5:
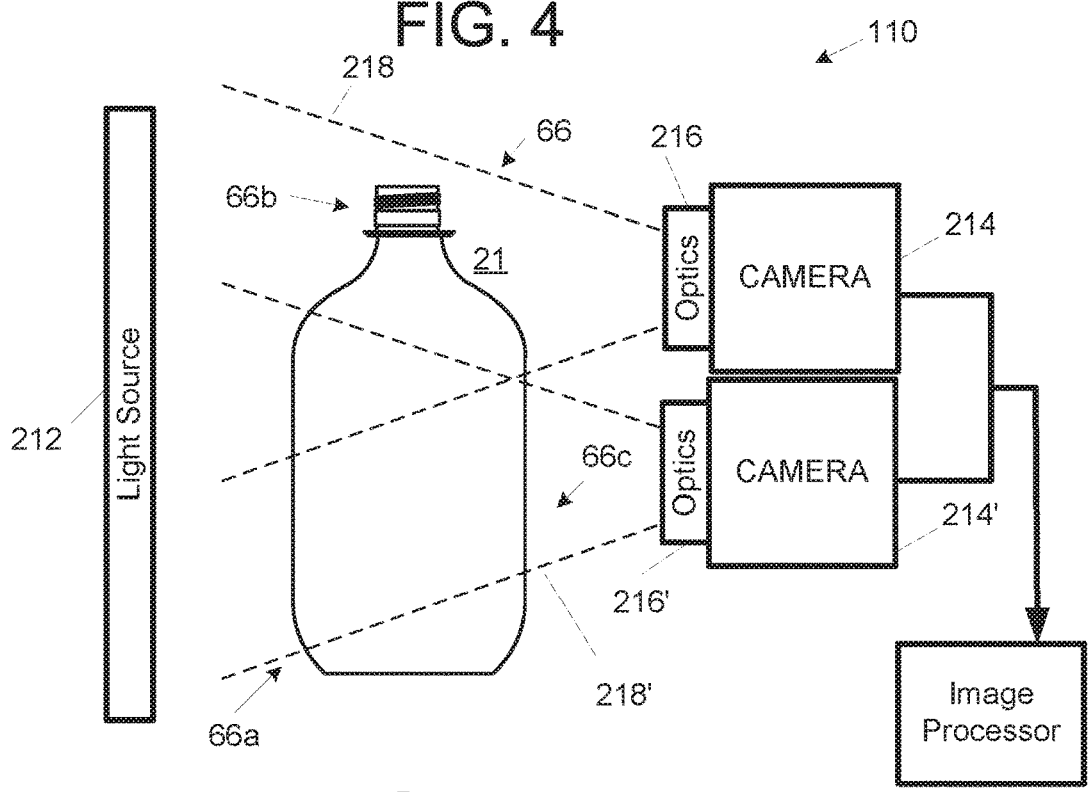
FIG. 5 is a block diagram showing one embodiment of a sidewall vision system.

FIG. 5 is a block diagram showing one embodiment of a sidewall vision system 110. The illustrated example sidewall vision system 110 comprises cameras 214, 214', optics 216, 216' a light source 212 and the optional image processor 210'. Images may be taken while the container 66 is in the inspection area 21, which may be positioned between the light source 212 and the cameras 214, 214'. As illustrated, the cameras 214, 214' and optics 216, 216' are configured to generate fields of view 218, 218' that show sidewall regions 66c of the container 66. The image processor 210' may perform various processing on images generated by the camera 214 including, for example, detecting container defects, detecting the clarity status (e.g., haze or pearlescence status) of the container, etc. In some embodiments, the image processor 210' performs pre-processing on images generated by the camera 214, with further processing performed directly by the control system 102. Also, in some embodiments, the image processor 210' may be omitted altogether. Also, in some embodiments, one or more of the cameras 214, 214' may be omitted and/or additional cameras with additional fields of view (not shown) added.

Figure 6:
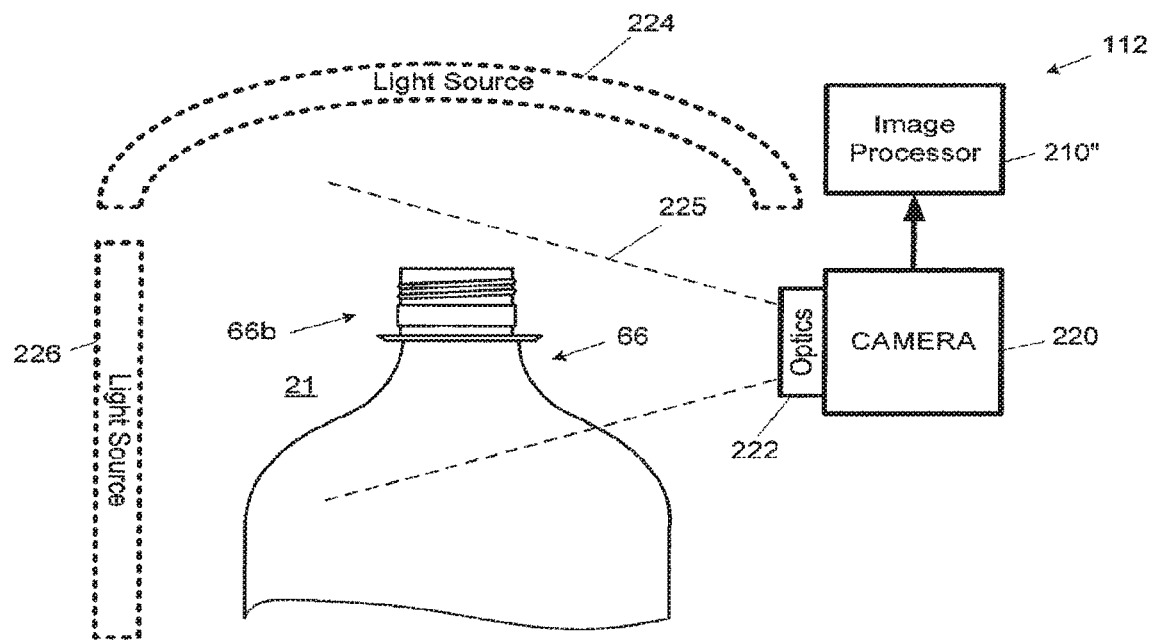
FIG. 6 is a block diagram showing one embodiment of a finish vision system.
Figure 7:
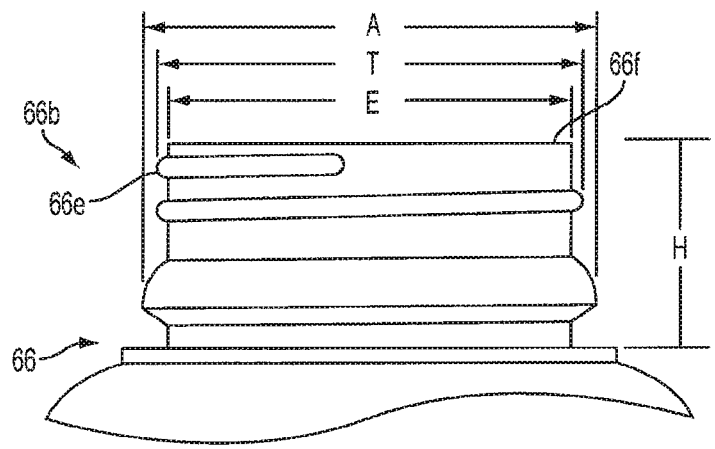
FIG. 7 is a diagram showing example finish dimensions that may be measured utilizing the finish vision system.

FIG. 6 is a block diagram showing one embodiment of a finish vision system 112. The illustrated example finish vision system 112 comprises camera 220, optics 222, light sources 224, 226, and the optional image processor 210". Images may be taken while the container 66 is in the inspection area 21, which may be positioned between the light sources 224, 226 and the camera 220. As illustrated, the camera 220 and optics 222 are configured to generate a field of view 225 that includes the finish area 66b of the container 66. In some configurations, the finish vision system 112 comprises a backlight source 226 positioned in the field of view 225 to illuminate the finish 66b. Also, in some embodiments, the finish vision system 112 comprises a round or bowl shaped light source 224 positioned above the vanish 66b. An image processor 210" may perform various processing on images including, for example, deriving from the images various container characteristics (e.g., dimensions, clarity status, etc.). Some or all of the image processing, however, may be performed by the control system 102 and, in some embodiments, the image processor 210" may be omitted. FIG. 7 is a diagram showing example finish dimensions that may be measured utilizing the finish vision system 112. For example, the dimension H indicates a height of the finish. A dimension A indicates a total width of the finish 66b. A dimension T indicates a width of the threads 66e of the container 66. A dimension E indicates a width of the seal 66f of the finish.

It will be appreciated that the various vision systems 108, 110, 112 may be embodied by any suitable type of system capable of generating images of the desired portions of the containers 66. For example, the base and sidewall vision systems 108, 110 may be implemented utilizing the Pilot Vision™ system, available from AGR International, Inc. of Butler, Pennsylvania. The finish vision system 112 may be implemented utilizing the Opticheck™ system, also available from AGR International, Inc. of Butler, Pennsylvania. It will further be appreciated that images from additional perspectives may be obtained by positioning cameras and light sources at different locations, for example, within the inspection area 20 or downstream of the blow molder system 4.

Figure 8:
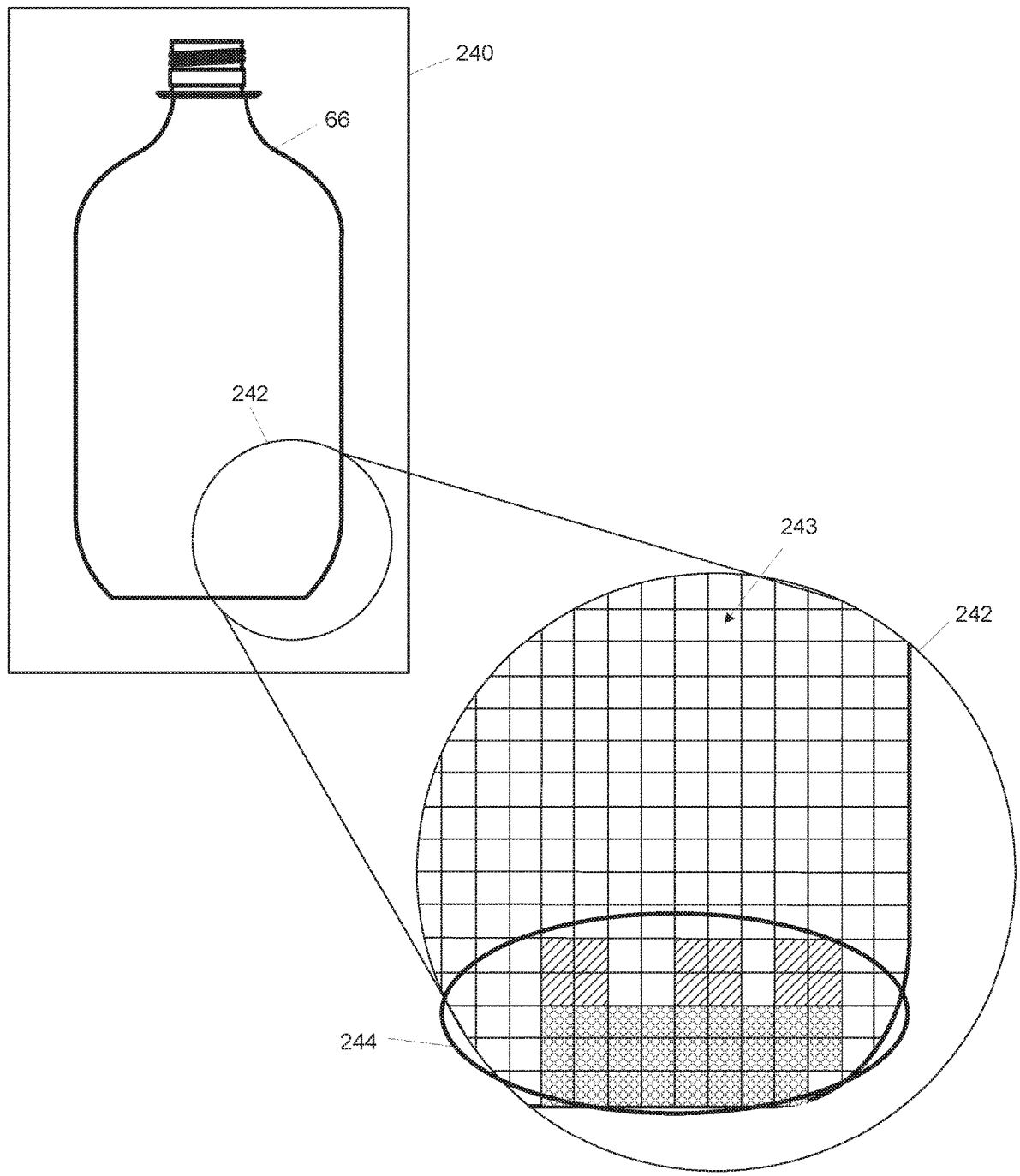
FIG. 8 is diagram showing an image of the container illustrating various methods for determining clarity status.

In some embodiments, outputs of the various vision systems 108, 110, 112 are utilized to determine the presence of haze or pearlescence, generally referred to herein as a clarity status. Processing to determine the clarity status of containers may be performed by the control system 102 and/or by any of the various image processors 210, 210', 210'' described herein. Any suitable image processing algorithm may be utilized to determine haze or pearlescence status (e.g., the clarity status) of a container. For example, FIG. 8 is diagram showing an image 240 of the container 66 illustrating various methods for determining clarity status. The image 240 is comprised of a plurality of pixels, where each pixel has a value. For example, when the image 240 is a gray-scale image, each pixel may have a value indicating the brightness of the image at the location of the pixel. When the image is a color image, the value of each pixel may indicate color as well as brightness. In FIG. 8, the emphasis area 242 is reproduced in larger form to illustrate image pixels 243. Gray-scale values for various pixels are indicated by shading. In practice, the control system 102, or other suitable processor, may identify instances of haze or pearlescence by examining the images for anomalous pixels. Anomalous pixels may be pixels having a gray-scale or other value that is different from the expected value, for example, indicating that the container 66 is darker than expected. Anomalous pixels may be identified in any suitable manner. For example, anomalous pixels may be darker than a threshold value and/or greater than a threshold amount darker than the average of all pixels making up the bottle. Pearlescence or haze may be detected, for example, by identifying a total number of anomalous pixels in the area representing the container 66 and/or a portion thereof (e.g., a base portion). Also, in some embodiments, a size and or number of contiguous groupings of anomalous pixels, such as grouping 244, may be utilized. Results of the algorithm may be expressed in a binary manner (e.g., pearlescence or haze is present; pearlescence or haze is not present) or in a quantitative manner, for example, based on the number of anomalous pixels or pixel groupings.

Figure 9:
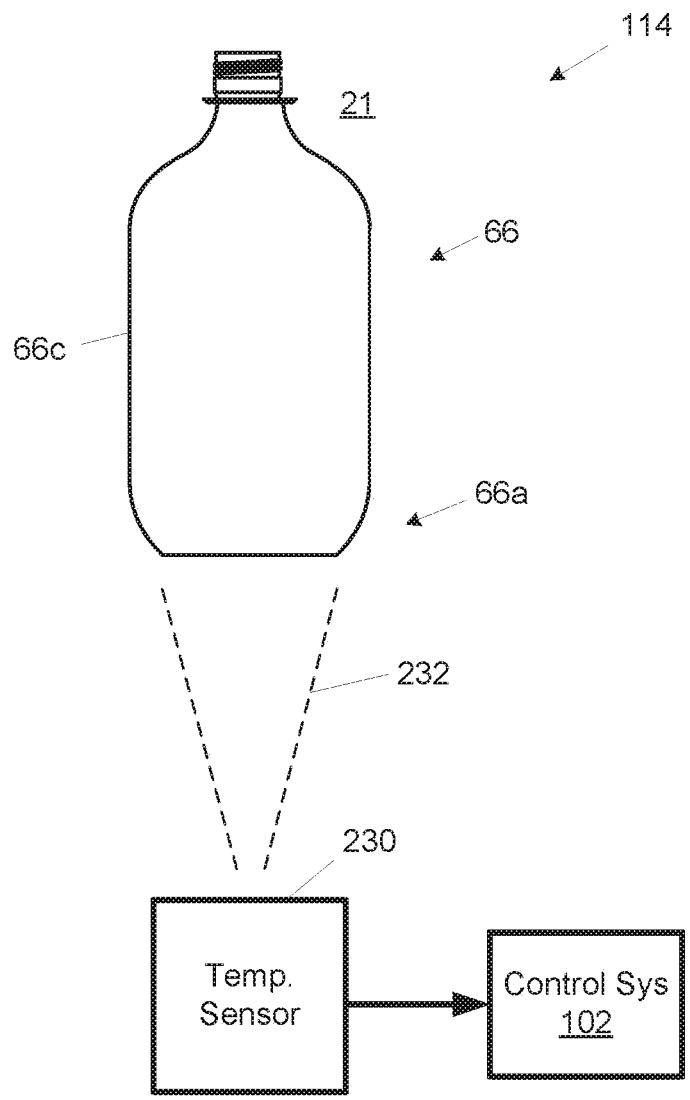
FIG. 9 is a diagram showing one embodiment of a base temperature sensor system.

FIG. 9 is a diagram showing one embodiment of a base temperature sensor system 114. The system 114 may comprise a temperature sensor 230 positioned with a field of view 232 that includes the base 66a of the container 66. The temperature of the base 66a of the container 66 may be taken while the container 66 is in the inspection area 21, which may be positioned in the field of view of the temperature sensor 230. The temperature sensor 230 may comprise any suitable non-contact or infrared sensor including, for example, any suitable pyrometer, an infrared camera, etc. Signals from the sensor 230 may be provided to the control system 102 and/or another suitable processor for deriving a base temperature from the signals. It will be appreciated that various other temperature sensors may be utilized including, for example, a sidewall temperature sensor (not shown) with a field of view directed at the sidewall area 66c of the container 66.

Figure 10:
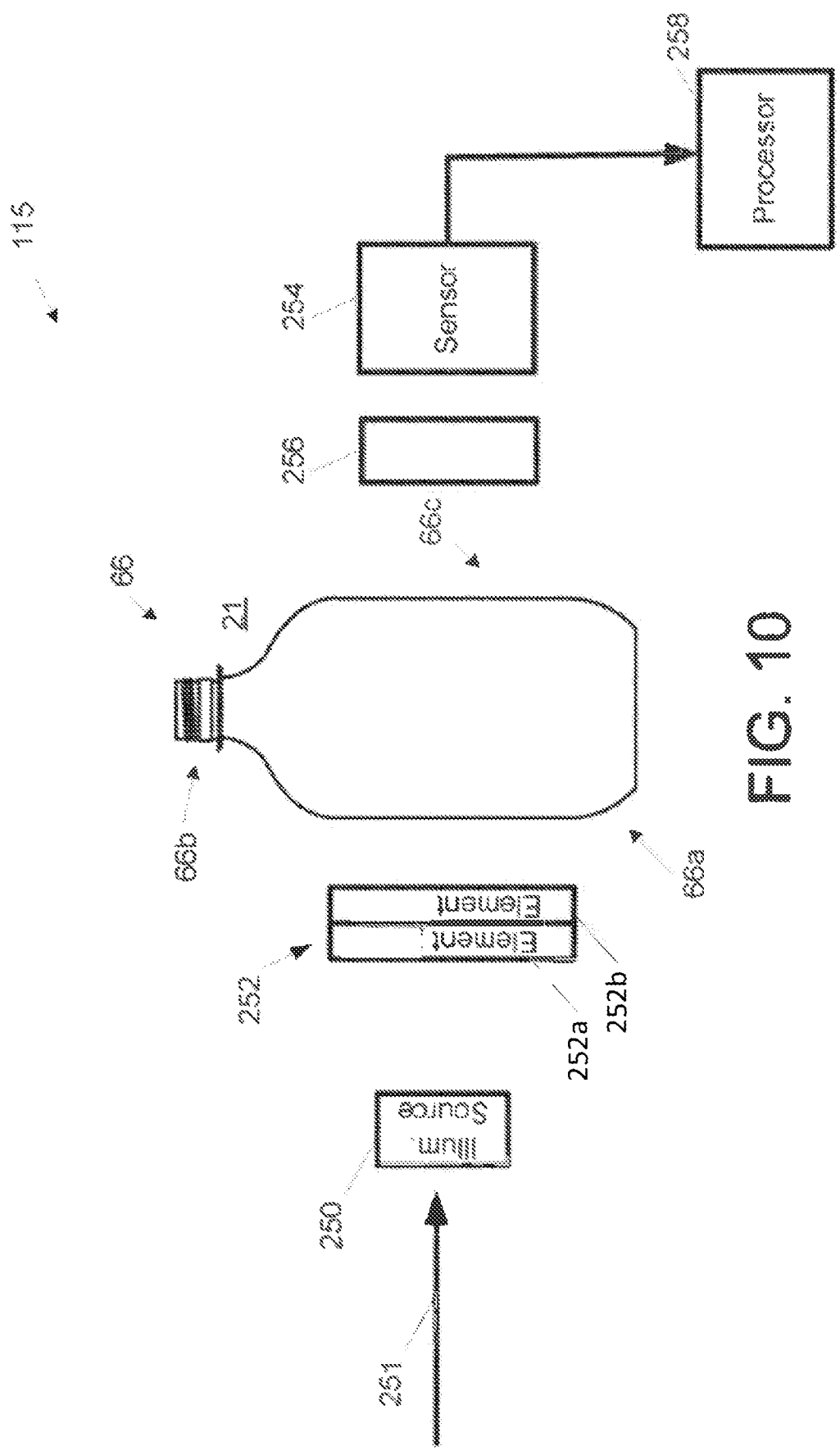
FIG. 10 is a diagram showing one embodiment of a birefringence sensor system for measuring crystallinity and/or orientation.

FIG. 10 is a diagram showing one embodiment of a birefringence sensor system 115 for measuring crystallinity and/or orientation. Birefringence is an effect found in many materials, including PET. In some embodiments, a birefringence sensor system 115 may be utilized in conjunction with cold mold-generated containers to measure crystallinity (or orientation) expressed as bi-axial lattice structure. Birefringence occurs when linearly polarized light with two orthogonal components travel at different rates through a material. Because the orthogonal components travel at different rates through the container 66, there is a resulting phase difference between the two light components. The difference in the rates of travel of the light components, and therefore the observed phase difference, depends on the level of crystallinity exhibited by the container. For example, one component may be considered the fast beam and the other a slow beam. The difference in rate, and therefore phase, is measured as retardance, which is the integrated effect of birefringence acting along an optical path in a material. Retardance is often measured according to a unit of (nm/cm thickness). Retardance can also be expressed as a phase angle when considering the wavelength of light used.

To measure retardance, a birefringence sensor system 115 may transmit linearly polarized light through the container 66. The system 115 may comprise a illumination source 250, a polarizer 252, and a sensor 254. Measurements of crystallinity may be taken while the container 66 is in the inspection area 21, which may be positioned between the illumination source 250 and the sensor 254. For example, the illumination source 250 and polarizer 252 may be positioned on one side of the container 66 and configured to illuminate the container 66. The sensor 254 may be positioned on a side of the container 66 opposite the illumination source 250 and polarizer 252 and may be configured to receive the illumination provided by the illumination source 250. The polarizer 252 may be oriented to cause illumination directed towards the container 66 to be linearly polarized with two orthogonal components. For example, the polarizer 252 may comprise two polarizer elements, 252a, 252b oriented orthogonal to one another about an optical axis 251. In some embodiments, the orientation of the linear polarizer 252 may be rotated about 45° relative to the axis of crystallization of the container 66. A sensor 254 opposite the source may receive the light, including the two orthogonal components. In some embodiments, an optional electrically controlled liquid crystal variable polarization device 256 or equivalent that filters the light is placed between the container 66 and the sensor 254. The variable polarization device 256 may be modified to allow the sensor 254 to alternately sense the two formerly orthogonal components of the incident beam and thereby measure the phase difference and/or difference in rate. For example, the angle difference between the positions of the variable polarization device 256 when measuring the two formerly orthogonal components may be proportional to the phase difference. The amount of phase difference per unit thickness of the container walls is the retardance. Accordingly, the end result may be a function of crystallinity and the thickness of the material. For example, the control system 102 may utilize container thickness (e.g., as measured by the material distribution system 106) to back-out a quantitative measurement of container crystallinity. Although the system 115 is illustrated in a configuration that directs the illumination through the sidewall regions 66c of the container 66, the system 115 may be configured to measure birefringence through any suitable portion of the container 66. In some embodiments, the sensor system 115 also comprises a processor 258. The processor 258 may, for example, process the output of the sensor 254 to generate a crystallinity reading for the container 66. In embodiments including the variable polarization device 256, the processor 258 may also be in communication with the variable polarization device 256 to control its polarization value. In various embodiments, some or all of these functionalities may be executed by the control system 102. For example, the processor 258 may be omitted.

Also, any suitable method or apparatus may be used for measuring birefringence or retardance. Examples of suitable methods and apparatuses for measuring birefringence or retardance may be found in the following sources, which are incorporated herein by reference in their entireties: Hagen, et al., "Compact Methods for Measuring Stress Birefringence;" Ai et al., "Testing stress birefringence of an optical window," SPIE Vol. 1531 Advanced Optical Manufacturing and Testing II (1991); Dupaix et al., "Finite strain behavior of poly(ethylene terephthalate) (PET) and poly(ethylene terephthalaate)-glycol (PETG), Polymer," Vol. 46, Iss. 13, pgs. 4827-4838 (17 Jun. 2005); and U.S. Pat. No. 5,864,403, filed on Feb. 23, 1998.

Figure 11:
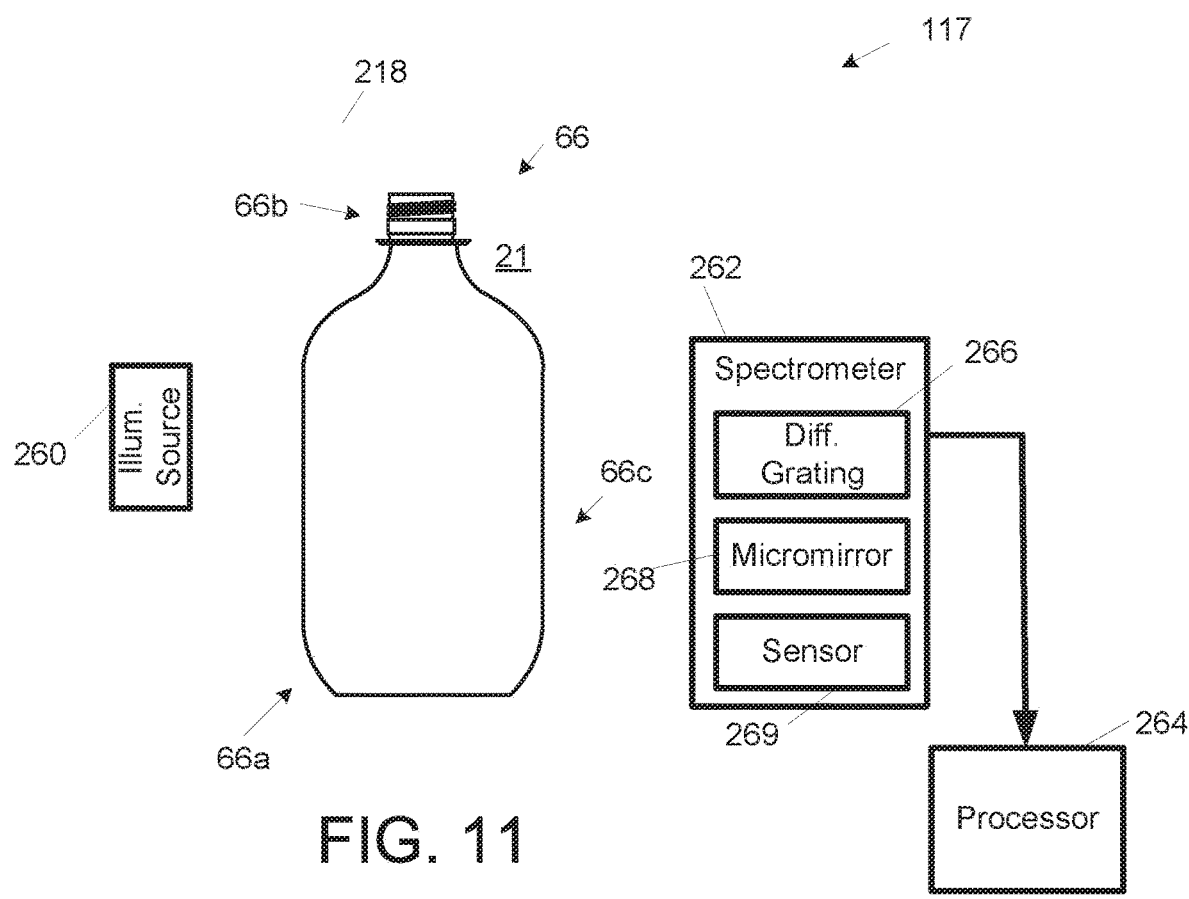
FIG. 11 is a diagram showing one embodiment of a near infrared (NIR) spectroscopy sensor system for measuring crystallinity.

FIG. 11 is a diagram showing one embodiment of a near infrared (NIR) spectroscopy sensor system 117 for measuring crystallinity. The system 117 may be positioned in the inspection area 20 of the blow molder system 4 and/or downstream of the blow molder system 4. In some embodiments, a NIR spectroscopy sensor system 117 may be used in conjunction with hot mold-generated containers to measure crystallinity expressed as spherulitic structure. The system 117 comprises an illumination source 260 positioned on one side of the container 66 and a spectrometer 262 positioned on another side of the container 66 opposite the container 66. The illumination source 260 and spectrometer 262 may be configured to measure absorption through the container 66 over all or a portion of the near infrared spectrum. For example, the illumination source 260 and spectrometer 262 may measure absorption across a wavelength range of 800 nm to 3000 nm. In some embodiments, the illumination source 260 and spectrometer 262 may measure absorption across a wavelength range of 2000 nm to 2400 nm.

The illumination source 260 and spectrometer 262 may be tuned to a particular wavelength or wavelength range in any suitable manner. For example, the illumination source 260 may be a broadband source generating illumination across the desired wavelength range. The spectrometer 262 may be configured to measure the intensity of the illumination (e.g., after transmission through the container 66) at different wavelengths. For example, the spectrometer 262 may comprise a diffraction grating 266 or other suitable optical device for separating received illumination by wavelength across the desired range (e.g., spatially separating the received illumination by wavelength). A controllable micromirror 268 or other similar device may direct a portion of the spatially separated illumination corresponding to a wavelength or wavelength range to a sensor 269, such as an InGaAs detector. The sensor 269 may provide an output signal proportional to the intensity of the received illumination at the wavelength or wavelength range directed to the sensor 269 by the micromirror 268. The micromirror 268 may be progressively tuned to direct different wavelengths or wavelength ranges to the sensor 269, providing a set of signals from the sensor 269 that indicate absorption of the illumination by the container 66 over the desired wavelength range. This may be referred to as an absorption spectrum or spectrum for the container 66. For example, the amount of illumination that is transmitted by the container 66 at any given wavelength may be the inverse of the absorption of the container 66 at that wavelength.

A processor 264 may be configured to control the micromirror 268 and/or receive and store signals from the sensor 269 to determine the absorption spectrum for the container 66. In some embodiments, some or all of the functionality of the processor 264 may be performed by the control system 102. For example, the processor 264 may be omitted. Also, although the illumination is shown to intersect the container 66 at the sidewall region 66c, the absorption spectrum may be taken at any suitable portion of the container 66. Also, FIG. 11 shows just one example spectrometer 262. Any suitable type of spectrometer may be used.

Figure 12:
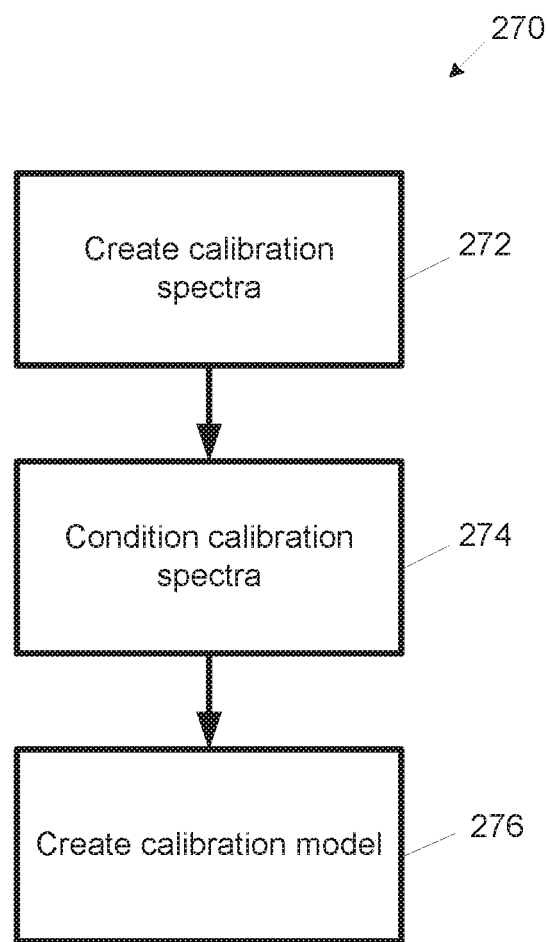
FIG. 12 is a flow chart showing one embodiment of a process flow that may be executed by the system to generate a crystallinity model that relates NIR absorption spectra to crystallinity.

Captured absorption spectra may correlate to the level of crystallinity in the molecules of the container 66. The processor 264 and/or control system 102 may utilize absorption spectra, as measured by the (NIR) spectroscopy sensor system 117, to measure the crystallinity of containers 66 in any suitable manner. FIG. 12 is a flow chart showing one embodiment of a process flow 270 that may be executed by the system 100 to generate a crystallinity model that relates NIR absorption spectra to crystallinity. For example, the process flow 270 may be executed by the processor 264 and/or the control system 102. At 272, the system 100 may generate a set of calibration spectra. For example, the system 100 may receive a set of calibration containers 66 having known crystallinity. For example, the calibration containers 66 may have had their crystallinity measured ahead of time using a off-line or lab based method such as, for example, a birefringence method, X-ray diffraction, Raman spectroscopy, near infrared (NIR) absorption spectroscopy, etc.

Figure 13:
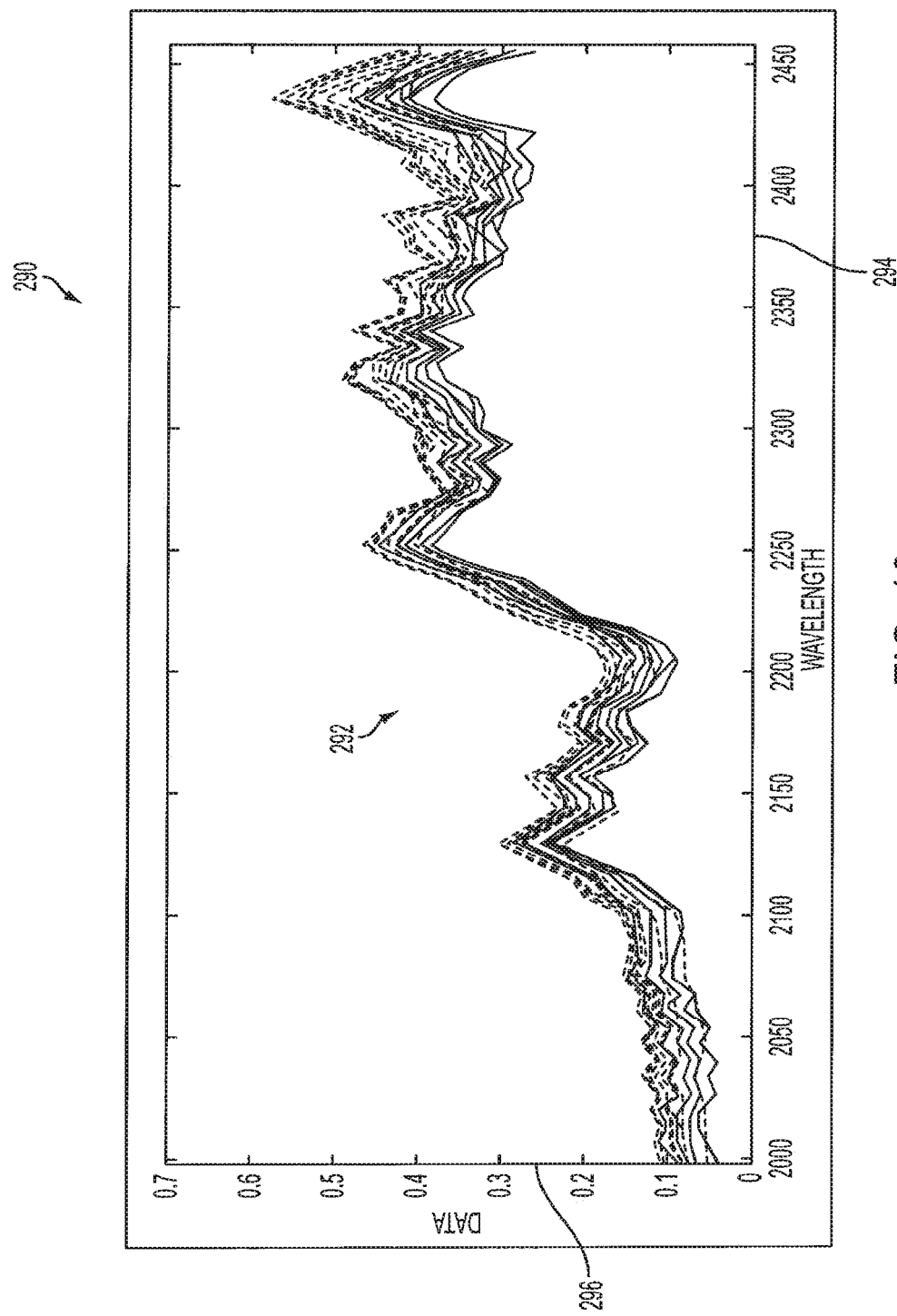
FIG. 13 is a chart showing one embodiment of a set of calibration spectra.

The calibration containers 66 may be processed by the system 102 using the NIR spectroscopy sensor system 117 as described herein above to generate an absorption spectrum for each of the calibration containers 66. For example, FIG. 13 is a chart 290 showing one embodiment of a set of calibration spectra 292. The chart 290 comprises a horizontal axis 294 indicating wavelength and a vertical axis 296 indicating the amplitude of the spectra 292. The indicated wavelength range is between 2000 nm and 2455 nm, although in some embodiments the spectra may be taken between 2000 nm and 2400 nm.

Figure 14:
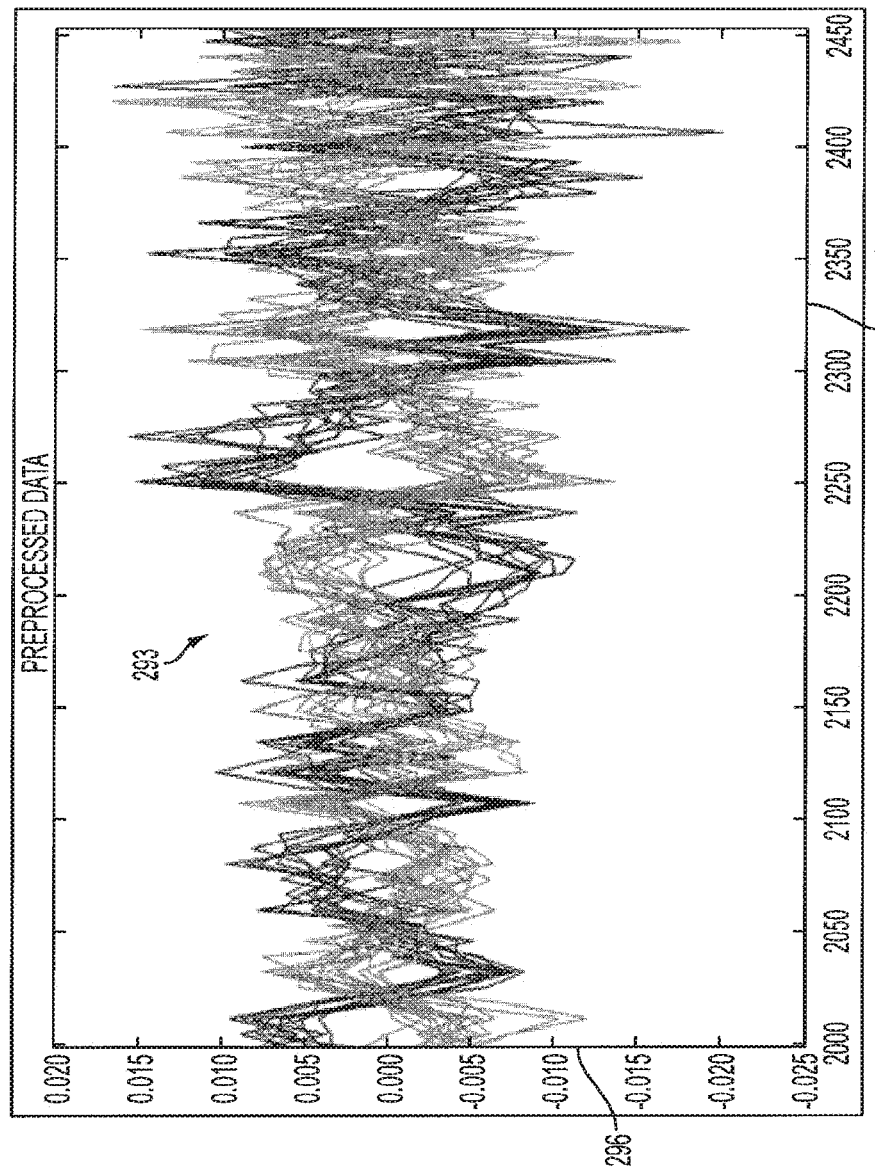
FIG. 14 is a chart showing one embodiment of the calibration spectra of FIG. 13 after conditioning.

As described herein, the calibration spectra 292 may indicate crystallinity. For example, crystallinity may be indicated by the amplitude of the spectra at different wavelengths, the wavelength position of amplitude peaks and troughs, etc. In addition to crystallinity information, however, the absorption spectra 292 may also include artifacts indicative of other factors including process factors such as direct current (DC) bias, tilt of the various components of the system 117, scattering effects, illumination path length, etc. as well as other properties of the container 66 such as, for example, the material make-up of the container 66, the material thickness of the container, etc. Referring again to FIG. 12, at 274, the system 100 may condition the calibration spectra 292 to remove contributions from process factors. The conditioning may take any suitable form. For example, the system 100 may apply centering, scaling, smoothing, derivatizing (first and/or second derivatizing), various transformations, baselining, etc. FIG. 14 is a chart 291 showing one embodiment of the calibration spectra 292 of FIG. 13 after conditioning.

Referring again to FIG. 12, at 276, the system 100 may utilize the conditioned calibration spectra 293 to generate a model relating the conditioned calibration spectra 293 to container crystallinity. The model may be generated according in any suitable manner according to any suitable method. In some embodiments, the model may be generated according to a partial least squares or PLS method. For example, performance data indicating the measured crystallinity of each of the calibration containers may make up an independent variable or x-block of data. The conditioned calibration spectra 293 may represent a dependent variable or y-block. A PLS model may be generated relating the x-block to the y-block. The model may include any suitable number of terms. For example, in some embodiments, the number of terms in the model may be selected to provide a desired degree of precision.

Figure 15:
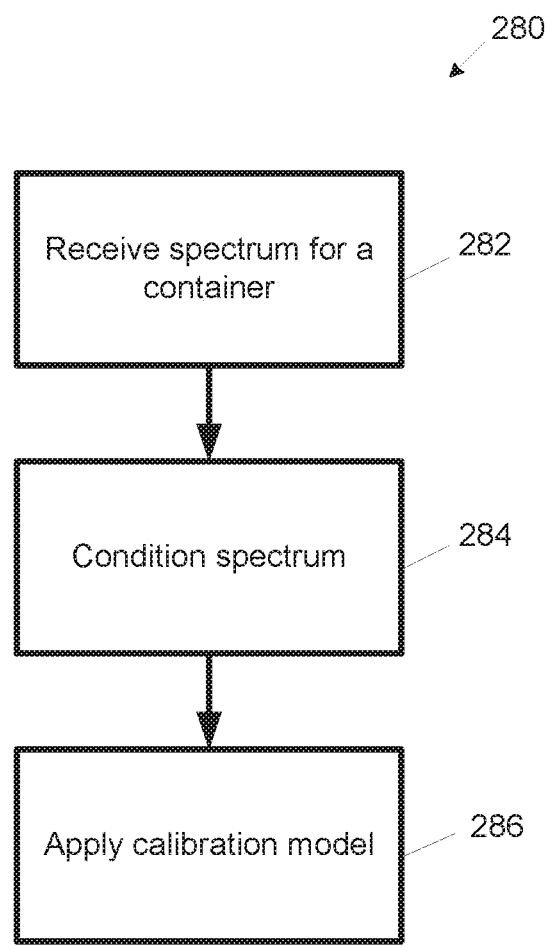
FIG. 15 is a flow chart showing one embodiment of a process flow for determining the crystallinity of a container in-line utilizing the model determined by the process flow of FIG. 14.

The model generated by the process flow 270 may be configured to receive a dependent variable (e.g., a conditioned spectrum from a container 66) and output a corresponding crystallinity for the container 66. In this way, the model may facilitate direct determinations of crystallinity for containers 66 in-line. FIG. 15 is a flow chart showing one embodiment of a process flow 280 for determining the crystallinity of a container in-line utilizing the model determined by the process flow 270. The process flow 280 may be executed by the system 100 such as, for example, by the control system 102 and/or the processor 264. At 282, the system 100 may receive an absorption spectrum for a container 66. The absorption spectrum may be captured by the NIR spectroscopy sensor system 117 described herein, for example, as the container is in-line. At 284, the system may condition the received spectrum. For example, the system 100 may apply the same conditioning, described at 274 above, that was applied to the calibration spectra 292 to generate the model. At 286, the system 100 may apply the calibration model to determine a crystallinity of the container 66.

In various embodiments, the control system 102 may be programmed to integrate results from the various inspection systems 103 to the particular molds and spindles within the blow molder 6, for example, as described in U.S. Pat. No. 7,374,713, which is incorporated herein by reference in its entirety.

Figure 16:
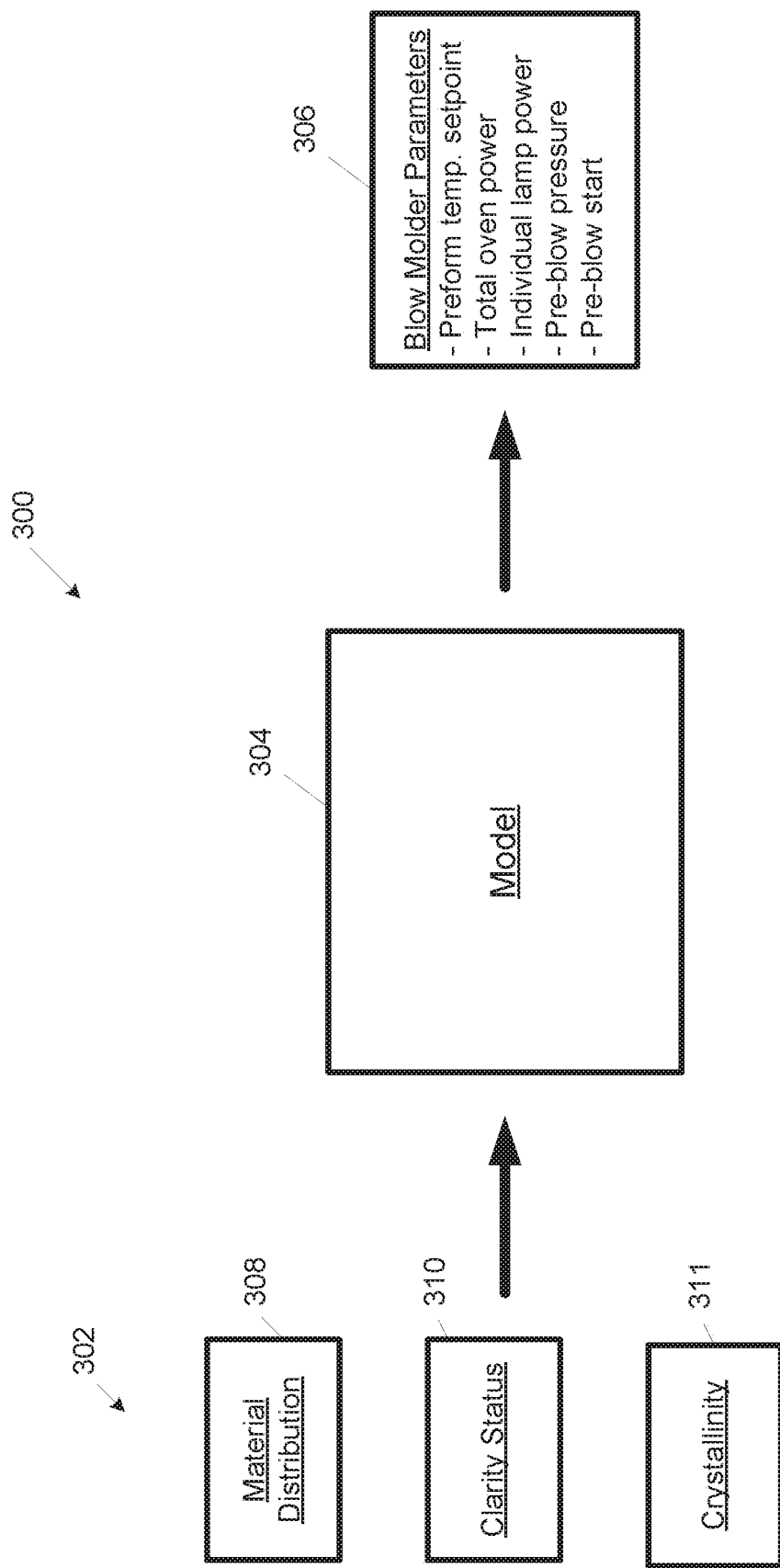
FIG. 16 is a block diagram showing one embodiment of a work flow that may be executed by the control system to control the blow molder system.

As described herein, the control system 102 may implement a single control loop or multiple control loops. FIG. 16 is a block diagram showing one embodiment of a work flow 300 that may be executed by the control system 102 to control the blow molder system 4 with a single control loop. A model 304 receives as inputs various container characteristics 302 describing containers generated by the blow molder. In the embodiment shown in FIG. 16, the input container characteristics are a material distribution 308, a clarity status 310. The clarity status may indicate a haze status if the model 304 is used in a hot mold process or a pearlescence status if the model 304 is used in a cold mold process. In addition to or instead of the clarity status, the model 304 may, in some embodiments, receive a direct measurement of container crystallinity 311. Based on the inputs 302, the model 304 produces values for blow molder input parameters 306 that are provided to the blow molder system 4 by the control system 102 (FIG. 2). FIG. 16 lists example blow molder input parameters. It will be appreciated, however, that the set of blow molder input parameters 306 predicted by the model 304 need not be identical to that shown and may include additional parameters or omit some of the parameters shown in FIG. 16.

Figure 17:
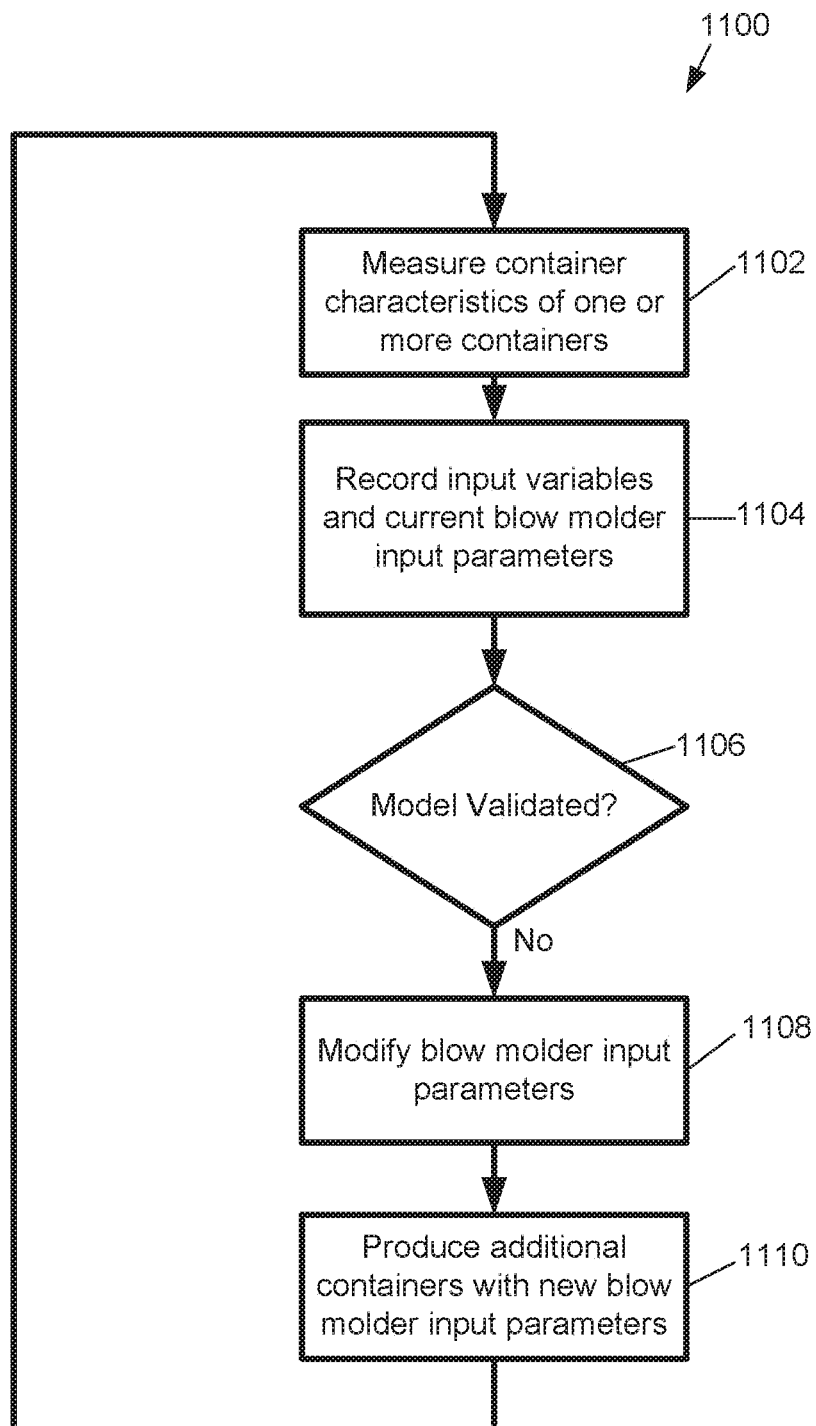
FIG. 17 is flow chart showing one embodiment of a process flow for training the model of FIG. 16.

The model 304 may be any suitable type of model and may be generated in any suitable manner. For example, the model 304 may be possible because of a strong $R^2$ correlation between the inputs 302 and the blow molder input parameters 306. The model 304 may be implemented and trained in any suitable manner. For example, FIG. 17 is flow chart showing one embodiment of a process flow 1100 for training the model 304. The process flow 1100 may be executed, for example, by the control system 102. At 1102, the system 102 may measure characteristics of containers generated by the blow molder system 4. For example, the material distribution 308 may be measured in conjunction with the material distribution system 106. The clarity status 310 may be measured in conjunction with one or more of the vision systems 108, 110, 112. The crystallinity may be measured by the birefringence sensor system 115 and/or the NIR spectroscopy system 117. In some embodiments, the operation of the blow molder system 4 is tuned (e.g., manually) prior to measuring the one or more containers such that the material distribution and clarity status of the measured containers is correct. Accordingly, the measured containers may establish a baseline material distribution and clarity status for the model.

In some embodiments, additional tuning may be performed relative to the crystallinity and clarity status before taking the baseline characteristic measurements at 1102. In a cold mold process, for example, the control system 102 may decrease the preform temperature set point until pearlescence appears (e.g., until the clarity status indicates that pearlescence is present).

Then the control system 102 may increase the preform temperature set point until pearlescence is no longer present. Subsequently, the control system may take the baseline measurements at 1102. Similarly, for a hot mold process, the control system 102 may increase the preform temperature set point until haze appears (e.g., until the clarity status indicates that haze is present). Then the control system 102 may decrease the preform temperature set point until pearlescence is no longer present before taking the baseline measurements at 1102. This may ensure that the baseline measurements for the model 304 are taken with crystallinity at or near its optimal value. Also, in various embodiments, the control system 102 may be programmed to periodically perform the described clarity tuning during operation of the blow molder system 4. This may correct for process drift, which may tend to push the blow molder system 4 away from generating containers at optimal crystallinity. In some embodiments, the baseline measurements at 1102 may be taken with the blow molder system 4 tuned to generate containers with small, but acceptable, levels of haze or pearlescence. This may drive the model 304 to generate containers with optimal crystallinity, as described herein.

At 1104, the control system 102 may record (e.g., store in memory) the container characteristics 302 of each generated container along with values of the blow molder input parameters 306 for the blow molder system 4 at the time that each container was produced. These values may be entered into a multi-dimensional matrix that may be used, for example, as described herein below. At 1106, the control system 102 may generate the model 304 relating blow molder input parameters and container characteristics. For example, the control system 102 may utilize the matrix to derive the model of blow molder system 4 parameters versus resulting container characteristics. The model 304 may be generated using any suitable technique or techniques. Example modeling techniques that may be used include, for example, linear regression methods, stepwise regression, principle components regression, etc. In some embodiments, the relationship between blow molder input parameters and material distribution indicated by the model is a relationship between desired changes in material distribution and corresponding changes in blow molder input parameters.

Optionally, the model may be tested or validated upon generation at 1106. For example, if the model generates blow molder input parameters that are out of an acceptable range, or the characteristics of the containers generated during the actions 1102, 1104 do not represent an acceptable baseline, the control system 102 may modify the blow molder input parameters at 1108 and generate new containers at 1110. The control system 102 may measure and/or derive the container characteristics at 1102, record (e.g., store in memory) the container characteristics 302 and new blow molder input parameters 306 at 1604 (e.g., to the multi-dimensional matrix) and determine, again, if the model 304 validates at 1106. In some embodiments, this process is repeated until the model 304 validates.

Once the model 304 is generated, it may be used to modify blow molder system 4 parameters based on the characteristics of completed containers 302. For example, the control system 102 may be programmed to drive the characteristics 302 of produced containers to a baseline material distribution. If the container characteristics of the produced containers deviate from the baseline (e.g., by more than a threshold amount), the control system 102 may utilize the model to determine a blow molder system 4 control parameter or parameters that may be modified to move the material distribution of subsequently produced containers back towards the baseline material distribution. For example, the material distribution of containers generated by the blow molder system 4 may drift due to changes in the conditions of or at the blow molder system 4.

Figure 18:
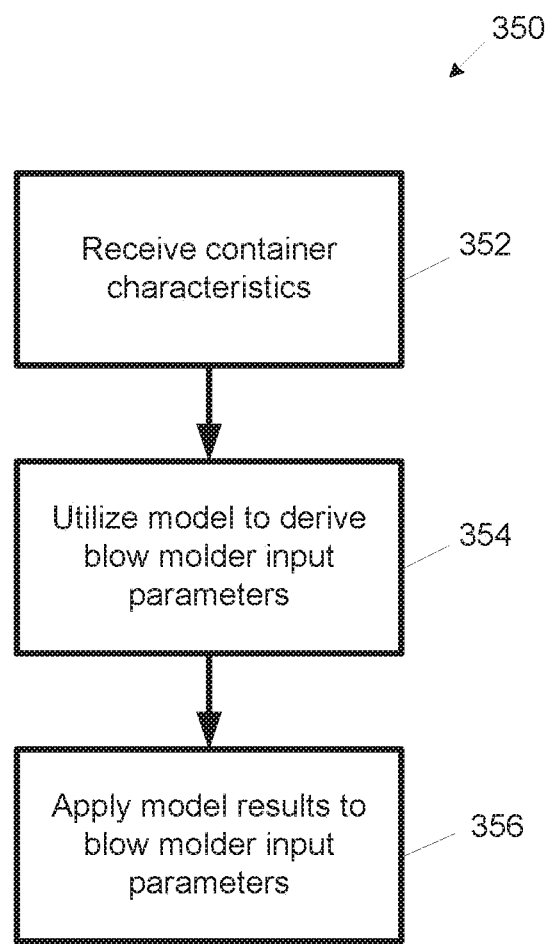
FIG. 18 is a flow chart showing one embodiment of a process flow that may be executed by the control system to apply the model of FIG. 16 to modify the blow molder input parameters based on the container characteristics of containers produced by the blow molder system.

FIG. 18 is a flow chart showing one embodiment of a process flow 350 that may be executed by the control system 102 to apply the model 304 to modify the blow molder input parameters 306 based on the container characteristics 302 of containers produced by the blow molder system 4. At 352, the control system 102 may receive values for the container characteristics 302. In some embodiments, as described herein, the control system 102 may perform processing on input signals from the inspection systems 103 to derive container characteristics, such as material distribution, clarity status, crystallinity, etc. At 354, the control system 102 may utilize the model 304 to derive blow molder input parameters. For example, the control system 102 may calculate an error signal representing a difference between the container characteristics of generated containers received and/or derived at 352 and the baseline characteristics measured during model training, as described with respect to FIG. 11. The error signal may represent a desired change in the container characteristics generated by the blow molder system 4. The error signal may be applied to the model 304, which may return changes that can be made to the blow molder system 4 input parameters to bring about the desired changes and drive the container characteristics back to the baseline. For example, utilizing the relationship between container characteristics 302 and blow molder input parameters 306, the control system 102 may derive blow molder input parameters 306 that minimize the difference between the container parameters and the baseline container parameters (e.g., the error signal) while also minimizing the differences between the derived blow molder input parameters 306 and the current parameters applied at the blow molder system 4. At 356, the control system 102 may apply the derived blow molder input parameters 306 to the blow molder system 4.

As described above, the initial baseline material distribution may be based on the containers measured to generate the model. In some embodiments, the model and/or an additionally generated model, may be used to correlate material distribution values to section weights, for example, as described in co-pending U.S. Patent Application Publication No. 2012-0130677, filed on Nov. 18, 2011 and incorporated herein by reference in its entirety.

A model generated in the manner described with respect to FIGS. 16-17 and applied as described with respect to FIG. 18 may be configured to make changes to the preform temperature set point so as to optimize crystallinity according to the determined baseline. For example, when used for hot mold processes, the model 304 may tend to decrease the preform temperature set point, or equivalent blow molder input parameter, when the clarity status indicates the presence of haze. Also, when used for cold mold processes, the model 304 may tend to increase the preform temperature set point, or equivalent blow molder input parameter, when the clarity status indicates the presences of pearlescence. When a direct crystallinity measurement is used in addition to or instead of a haze or pearlescence measurement, the model 304 may tend to drive the container crystallinity to a desired value, for example, as set by the baseline.

Figure 19:
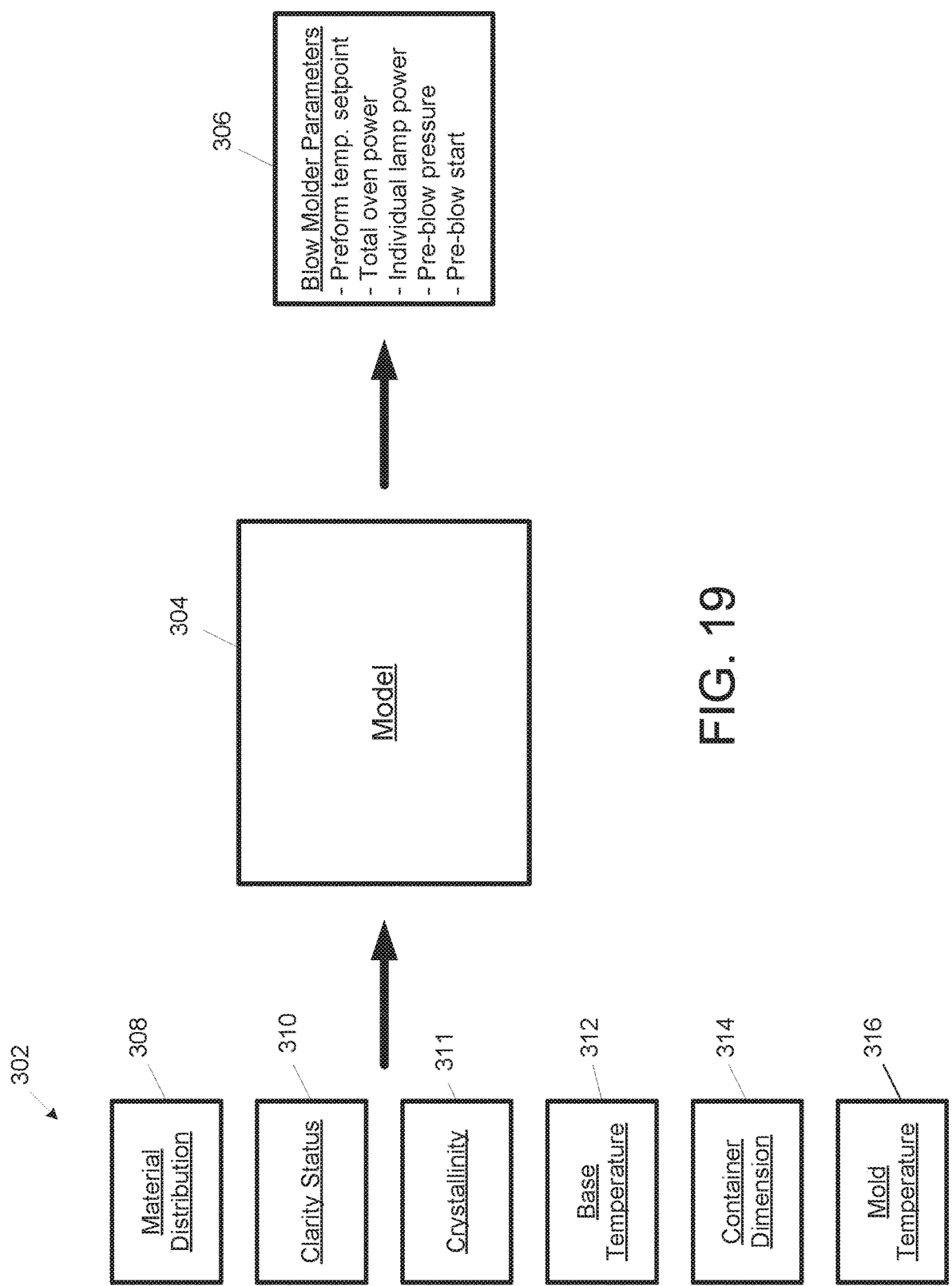
FIG. 19 is a flow chart showing one embodiment of the work flow of FIG. 16 including additional input container characteristics.

It will be appreciated that the model 304 may be further expanded to consider additional input container characteristics 302. For example, FIG. 19 is a flow chart showing one embodiment of the work flow 300 of FIG. 16 including additional input container characteristics. FIG. 19 shows a base temperature characteristic 312 and a container dimension characteristic 314. The base temperature characteristic 312 may be utilized, for example, in cold mold processes to manage base sag. For example, the base temperature 312 may be indicative of either an energy of the container base and/or an amount of material in the container base. As described herein, high values for either are consistent with a high likelihood that the containers will exhibit base sag. The container dimension characteristics 314 may be indicative of any dimension on any portion of the container. For example, the container dimension characteristics 314 may include one or more finish dimensions, for example, as described herein with respect to FIG. 7. To incorporate additional inputs 314, 316, the blow molder system 4 may be tuned as described above (e.g., manually) to achieve baseline values for the inputs 314. Then the model may be developed and trained, for example, as described herein with respect to FIGS. 16 and 17 and applied, as described herein with respect to FIG. 18.

In some embodiments, the model 304 may take additional inputs such as a mold temperature input 316. The mold temperature 316 may be measured by a separate sensor, such as a pyrometer or infrared camera, directed at one or more of the molds of the blow molder 6. In some embodiments, the blow molder 6 may be manufactured with a built-in sensor or sensors for measuring mold temperature. The control system 102 may, then, receive the mold temperature directly from the blow molder. A baseline value for the mold temperature may also be set prior to the model generation, as illustrated in FIGS. 16 and 17. For example, the baseline mold temperature may be the mold temperature when the container characteristics are otherwise at desirable values.

Figure 20:
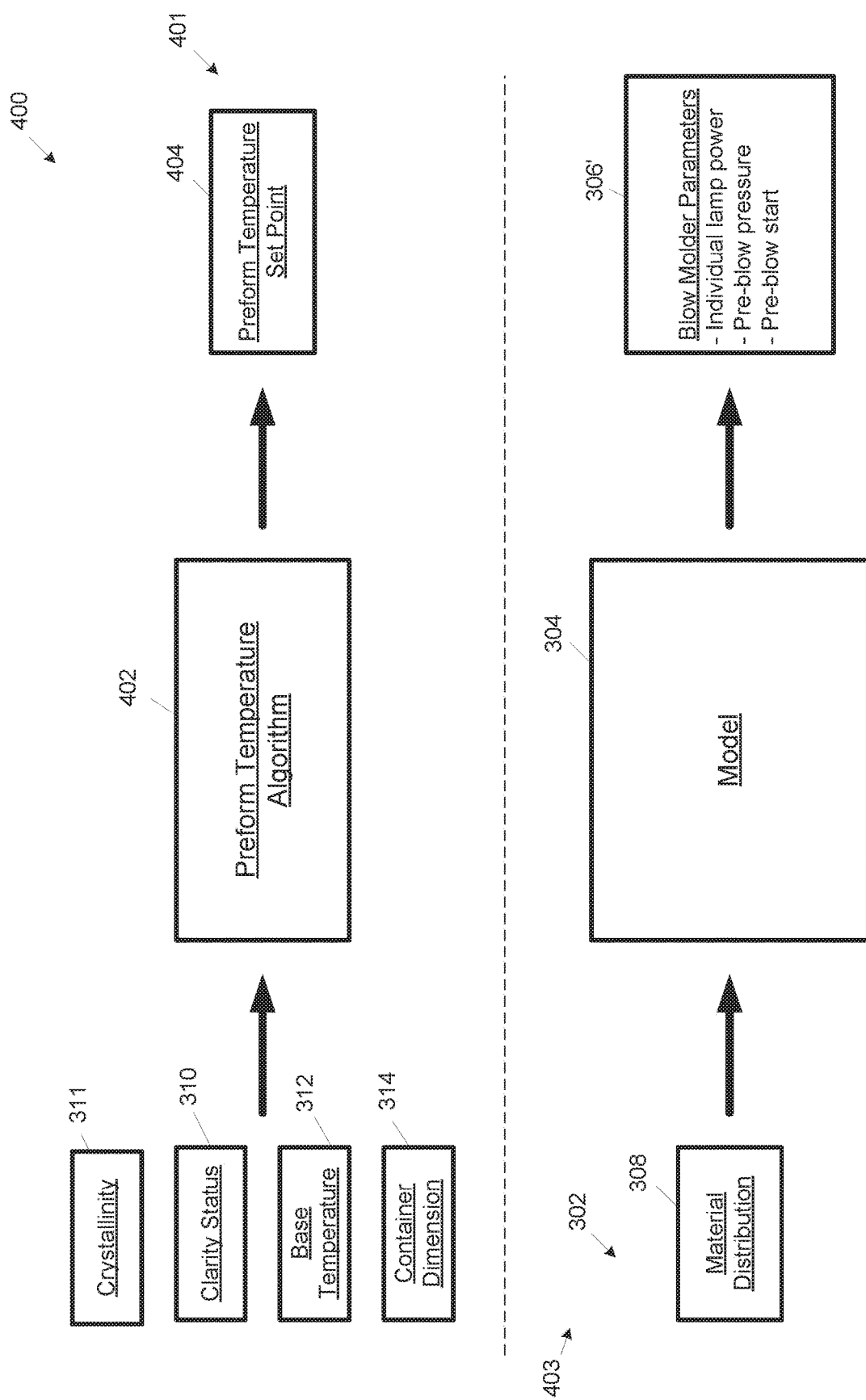
FIG. 20 is a block diagram showing one embodiment of a work flow that may be executed by the control system to control the blow molder system utilizing two control loops.

FIG. 20 is a block diagram showing one embodiment of a work flow 400 that may be executed by the control system 102 to control the blow molder system 4 utilizing two control loops 401, 403. A material distribution control loop 403 may implement the model 304 as described above to generate blow molder parameters 306' that may be provided to the blow molder system 4 to drive the material distribution of generated containers towards a desired baseline distribution. In the material distribution control loop 403, however, the model 304 may be generated and tuned to drive a set of blow molder parameters 306' that excludes the preform temperature set point 404 and/or equivalent blow molder parameters, which may be driven by the preform temperature control loop 401. The preform temperature control loop 401 comprises a preform temperature algorithm 402, executed by the control system 102, which receives as input one or more container characteristics, such as the crystallinity 311, the clarity status 310, the base temperature 312 and one or more container dimensions 314, and generates as output the preform temperature set point 404 or equivalent parameter. In this way, the material distribution control loop 403 may drive blow molder input parameters 306' that affect material distribution, while the preform temperature control loop 401 may drive blow molder input parameters (e.g., the preform temperature set point or equivalent 404) that affect clarity, base sag, and certain container dimensions. Additional input container characteristics, for example, as described herein above, may be incorporated into either the material distribution control loop 403 and/or the preform temperature control loop.

Figure 21:
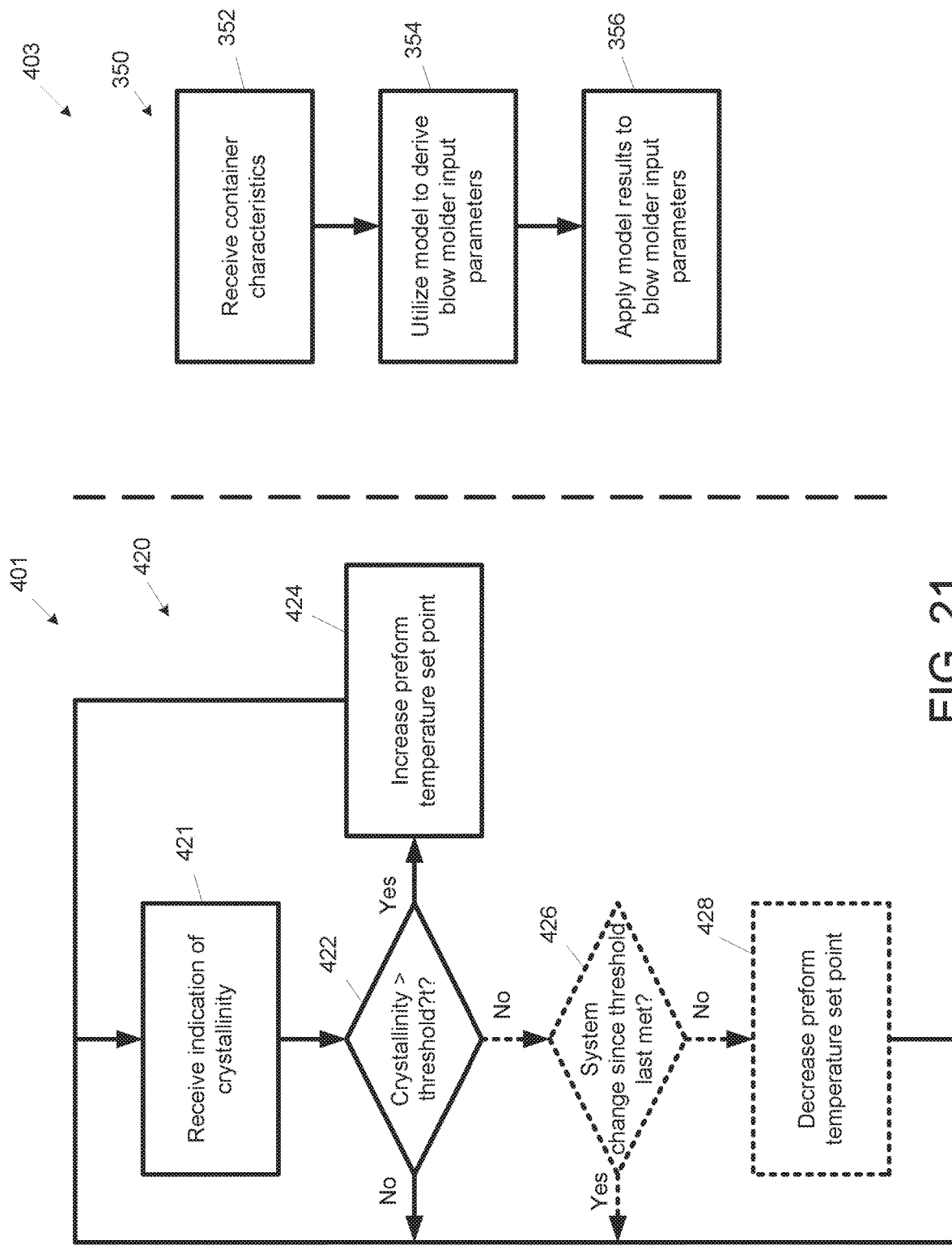
FIG. 21 is a flow chart showing one embodiment of a set of process flows for executing the material distribution control loop and preform temperature control loop shown in FIG. 20 in a cold mold process.

FIG. 21 is a flow chart showing one embodiment of a set of process flows 420, 350 for executing the material distribution control loop 403 and preform temperature control loop 401 shown in FIG. 20 in a cold mold process. Process flow 420 is an example implementation of the preform temperature algorithm 402 of the preform temperature control loop 401. Process flow 350 is an example implementation of the material distribution control loop 403. The process flows 420, 350 may be executed by the control system 102, for example, simultaneously to control the relevant blow molder input parameters. In this way, any unintended changes to material distribution that result from application of the process flow 420 as part of the preform temperature control loop 401 may be corrected by the algorithm 350 as part of the material distribution control loop 403. The process flow 350 may be similar to the process flow 350 described above with respect to FIG. 18. For example, the material distribution control loop 403 may execute the model 304 in a manner similar to that described above with respect to FIGS. 16, 17 and 18 to drive the material distribution of containers produced by the blow molder towards a baseline material distribution.

Referring to the process flow 420, at 421, the control system 102 may receive an indication of crystallinity. The indication of crystallinity may be a direct indication of crystallinity, for example, as measured by a birefringence sensor system such as 155, or may be an indirect measure of crystallinity such as a pearlescence or clarity status. If crystallinity is above a threshold level, then the control system may increase the preform temperature set point at 424. When the indication of crystallinity is a direct measure of crystallinity, the threshold level may be a particular value or range of values for crystallinity. When the indication of crystallinity is a pearlescence or clarity status, the threshold level may be when the pearlescence status is present (e.g., there is pearlescence detected in the output containers) and/or above a pearlescence threshold level. When the indication of crystallinity is above the threshold, the control system 102 may increase the preform temperature set point at 424. For example, the preform temperature set point may be increased by a predetermined increment. If the indication of crystallinity is not above the threshold, then the control system 102 may return to action 421 and continue to execute the process flow 420. In this way, the preform temperature control loop 401 may control the preform temperature set point to drive the blow molder system 4 away from generating containers that exhibit pearlescence. In some embodiments, when the indication of crystallinity is not above the threshold, the control system 102 may reduce the preform temperature set point before returning to action 421. In embodiments where a direct crystallinity measurement is taken, the process flow 401 may comprise a decision step where the control system 102 compares the container crystallinity to a desired threshold or range. If the crystallinity is above the desired threshold or range, then the preform temperature set point may be increased. If the crystallinity is below the desired threshold or range, then the preform temperature set point may be maintained or decreased. This may occur in addition to or instead of the comparison of pearlescence to the threshold at 422.

Optionally, the process flow 420 may comprise additional steps for reorienting the process towards optimal crystallinity (e.g., the lowest preform/mold temperature that avoids pearlescence). For example, instead of proceeding back to 421 upon determining at 422 that the crystallinity is not above the threshold, the control system 102 may determine at 426 whether there has been a system change since the last time (if any) that the crystallinity was above the threshold. If at 426, the control system 102 determines that the crystallinity has been above the threshold since the last system change, then the control system 102 may proceed to 421, as descried above. A system change may indicate that the system conditions have changed in a way that may have moved container crystallinity, but in a direction that does not cause pearlescence or haze. For example, a system change may be indicated the first time that the process flow 420 is executed. Also, for example, a system change may be indicated when the control system 102 receives an indication that the temperature of generated containers or the temperature of the mold has changed. Such a change in container temperature may be indicated by a direct measurement of container temperature (e.g., a base temperature) and/or from a measurement of the mold temperature. In some embodiments, a system change may be indicated when the crystallinity of the produced containers drops below a threshold value.

If at 426, the control system 102 determines that crystallinity has not been above the threshold since the last system change, the control system 102 may decrease the preform set temperature at 428 and then proceed back to 421. This may tend to drive the blow molder system 4 closer to the crystallinity threshold, but also towards the optimal crystallinity. If a decrease in preform temperature set point at 428 pushes the blow molder system 4 past the crystallinity threshold, then the resulting pearlescence will be detected at 422, resulting in a corrective increase in preform temperature set point at 424. In some embodiments, described herein, a clarity status may be utilized in lieu of actively finding the crystallinity of the containers. Also, in some embodiments, decision action 426 may be omitted, and the control system 102 may decrease the preform set point at 428 any time that the crystallinity is above the threshold.

Figure 22:
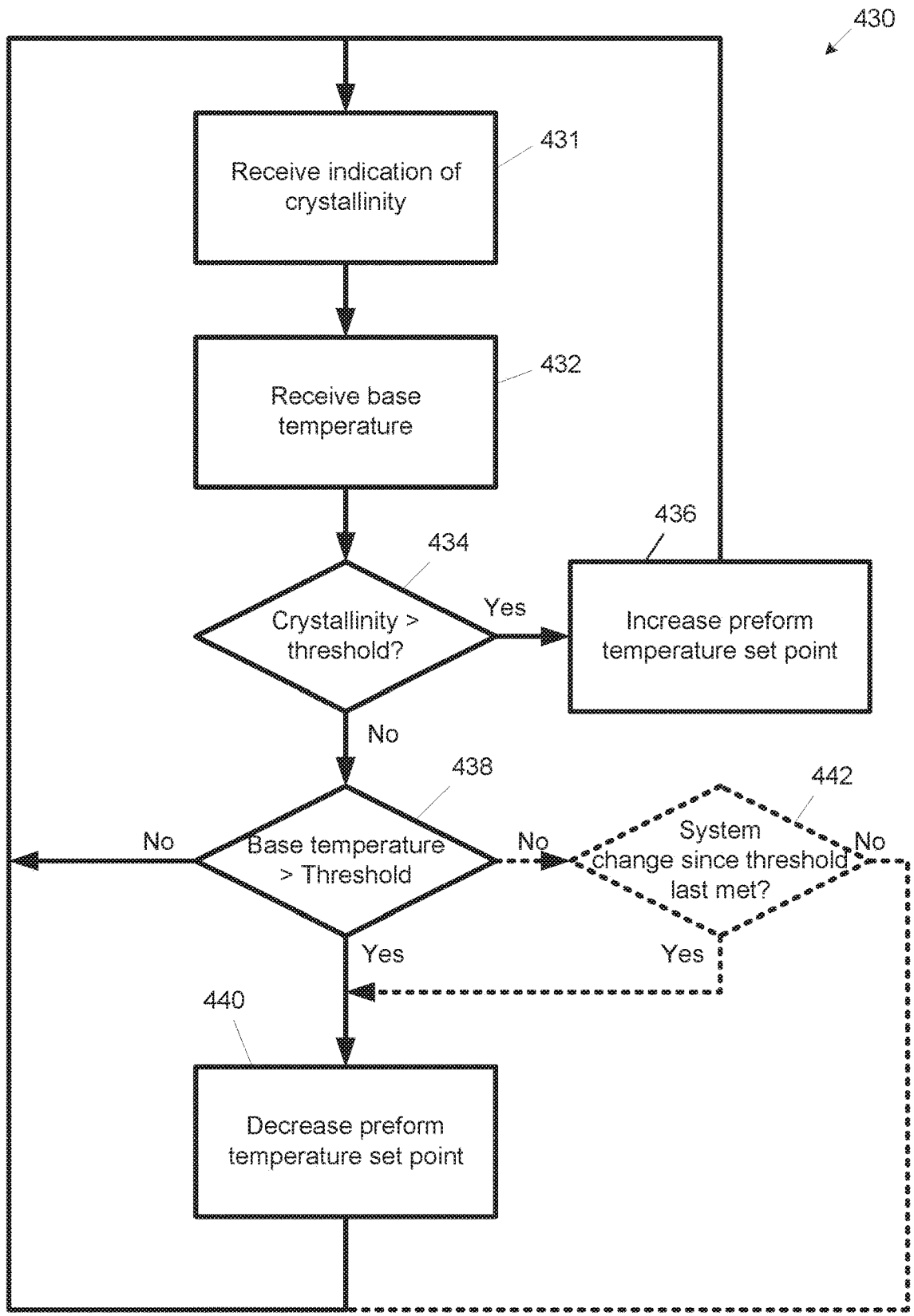
FIG. 22 is a flow chart showing one embodiment of a process flow representing an alternate implementation of the preform temperature algorithm of the preform temperature control loop of FIG. 20 that also considers a container base temperature in a cold mold process.

FIG. 22 is a flow chart showing one embodiment of a process flow 430 representing an alternate implementation of the preform temperature algorithm 420 of the preform temperature control loop 401 that also considers a container base temperature in a cold mold process. At 431, the control system 102 may receive a pearlescence status of containers generated by the blow molder system 4. At 432, the control system 102 may receive a base temperature reading of containers generated by the blow molder system 4. In some embodiments, the base temperature reading and crystallinity may be received in any order, or simultaneously. If the crystallinity indicates is above the threshold at 434, then the control system 102 may increase the preform temperature set point at 436 and return to action 431. If the crystallinity is not above the threshold, the control system 102 may determine whether the base temperature is greater than a threshold base temperature at 438. If the base temperature is greater than the threshold base temperature, then the control system 102 may decrease the preform temperature set point at 440 and return to action 431. If the base temperature is not greater than the threshold base temperature, then the control system 102 may return to action 431 without decreasing the preform temperature set point.

The algorithm 430 also comprises optional steps for reorienting the process towards optimum crystallinity upon detection of a system change. For example, instead of proceeding to 431 after determining that the base temperature is not greater than the threshold, the control system 102 may determine, at 442, whether there has been a system change since the last time that the crystallinity met the threshold. If not, then the control system 102 may proceed to 431. If so, then the control system 102 may decrease the preform temperature set point at 440 before returning to 431. It will be appreciated that the order of the actions 434, 438 may be reversed so as to reverse the relative importance of crystallinity versus base temperature. For example, in an application where it is relatively more important to avoid base sag than it is to avoid pearlescence, then action 438 may be executed prior to action 434. Also, it will be appreciated that additional input values may be accommodated by utilizing additional decision steps similar to 434, 438.

Figure 23:
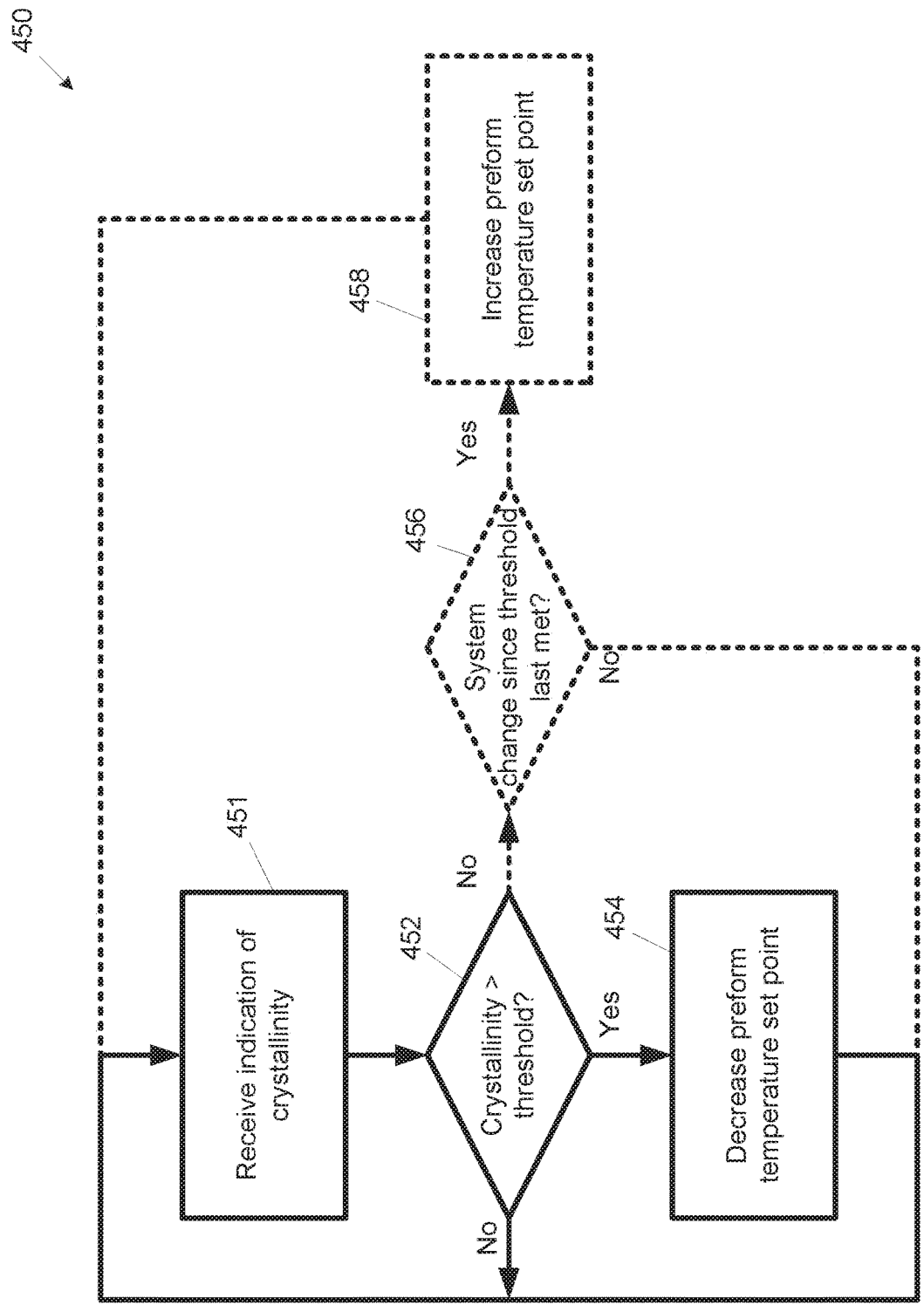
FIG. 23 is a flow chart showing one embodiment of a process flow representing an alternate implementation of the preform temperature algorithm of the preform temperature control loop of FIG. 20 in a hot mold configuration.

FIG. 23 is a flow chart showing one embodiment of a process flow 450 representing an alternate implementation of the preform temperature algorithm 402 of the preform temperature control loop 401 in a hot mold configuration. At 451, the control system 102 may receive an indication of crystallinity (e.g., a direct crystallinity measurement and/or a clarity status indicating the presence or absence of haze). If the indication of crystallinity is above a threshold at 452, the control system 102 may decrease the preform temperature set point at 454. When the indication of crystallinity is a direct crystallinity measurement, it may be above a threshold when it is above a particular value. When the indication of crystallinity is a clarity or haze status, it may be above the threshold, for example, if the clarity status indicates that haze is present and/or that haze is above a threshold level. If indication of crystallinity is not above the threshold at 452, the control system 102 may return to action 451.

Optionally, the control system 102 may execute a control sequence for reorienting the process near the optimal crystallinity. For example, when indication of crystallinity is below the threshold at 452, instead of returning to 451, the control system 102 may determine, at 456, whether there has been a system change since the last time that the crystallinity was above the threshold. A system change may be indicated by various different values including, for example, a change in the temperature of containers generated by the blow molder system 4 (e.g., a sidewall temperature), a change in a temperature of the mold or molds, etc. If there has been no system change since the last time that the haze status was present, then the control system 102 may return to action 451. If there has been a system change since the last time that the haze status was present, then the system 102 may increase the preform temperature set point at 458 and then proceed to action 451. Optionally, action 456 may be omitted and the preform temperature set point may be decreased at 458 when it is determined at 452 that the haze status is present and/or greater than the haze threshold.

Figure 24:
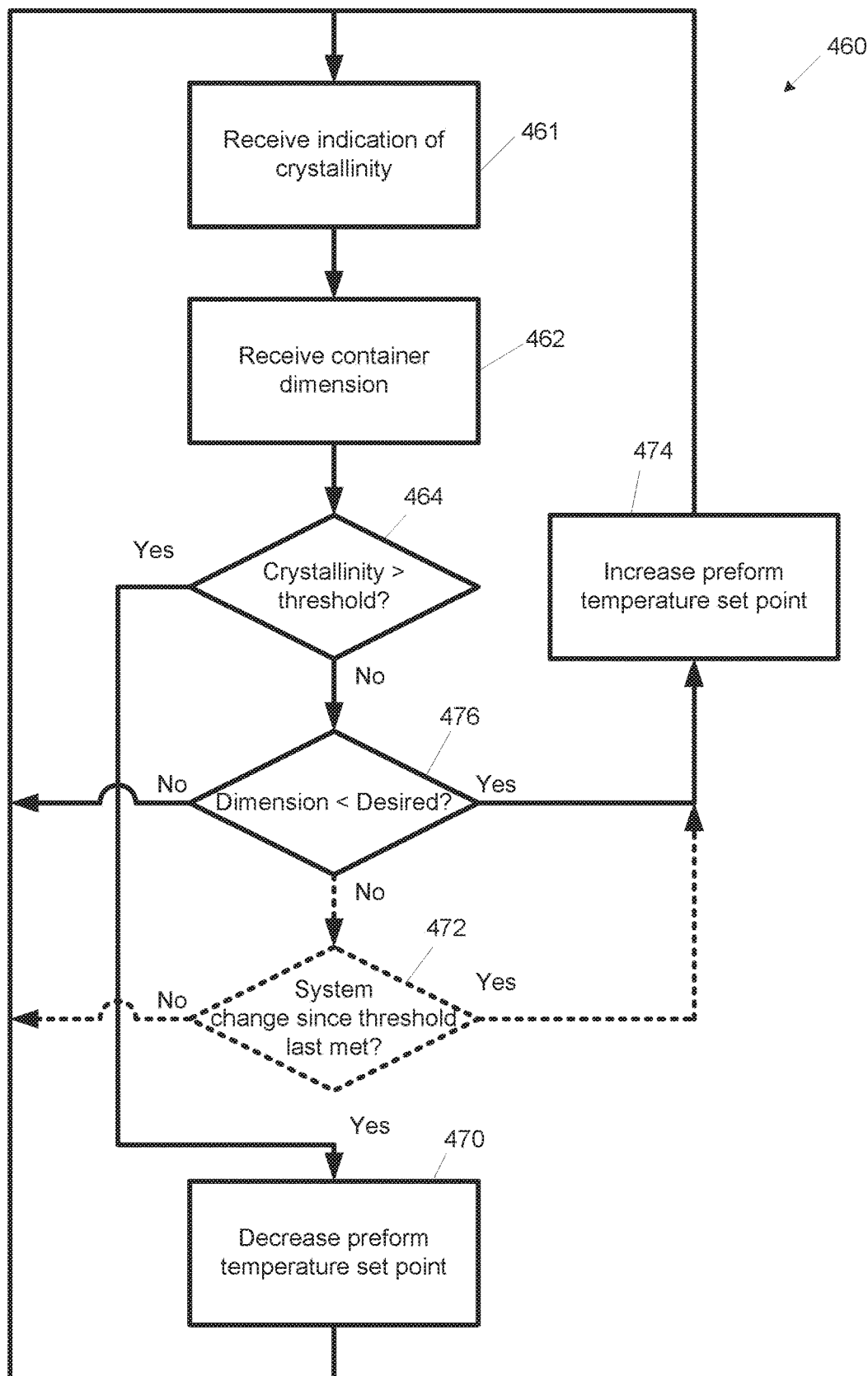
FIG. 24 is a flow chart showing one embodiment of a process flow representing an alternate implementation of the preform temperature algorithm of the preform temperature control loop of FIG. 20 in a hot mold configuration and including additional actions that correct for container dimensions.

FIG. 24 is a flow chart showing one embodiment of a process flow 460 representing an alternate implementation of the preform temperature algorithm 402 of the preform temperature control loop of FIG. 20 in a hot mold configuration and including additional actions that correct for container dimensions. At 461, the control system 102 may receive the indication of crystallinity for containers generated by the blow molder system 4. At 462, the control system 102 may receive an indication of a container dimension for containers generated by the blow molder system 4. It will be appreciated that the control system 102 may receive the indication of crystallinity at 461 and the container dimension at 462 in any order, or simultaneously. If, at 464, the indication of crystallinity is greater than the threshold, then the control system 102 may decrease the preform temperature set point at 470 and return to 461. If the crystallinity is not greater than the threshold at 464, the control system 102 may determine at 476 whether one or more container dimensions are less than or equal to a desired dimension threshold. As described herein above, this may indicate that the preforms are not hot enough to generate an adequate mold fill factor. If the measured dimension or dimensions are less than the threshold, then the control system 102 may increase the preform temperature set point at 474. If not, then the control system 102 may proceed to 461.

In an optional control sequence for reorienting the process near the optimal crystallinity, instead of returning to 461 when the container dimensions are not below the threshold, the control system may proceed to 472. If at 472 the control system 102 determines that there have not been any system changes the last time (if any) that the indication of crystallinity was above the threshold, then the control system 102 may return to 461. If there has been a system change since the last time that the indication of crystallinity was above the threshold, then the control system may increase the preform temperature set point at 474 before returning to 461. It will be appreciated that the relative importance of the variables of the process flows 450 and 460 may be changed by changing the orders in which their respective decision steps are considered. Also, additional decision steps for additional variables may be added and/or some of the decision steps for the described variables omitted, depending on the implementation.

The examples presented herein are intended to illustrate potential and specific implementations of the embodiments. It can be appreciated that the exemplary embodiments are intended primarily for purposes of illustration for those skilled in the art. No particular aspect or aspects of the examples is/are intended to limit the scope of the described embodiments.

As used in the claims, the term "plastic container(s)" means any type of container made from any type of plastic material including, polyethylene terephthlat (PET), oriented polypropolyene (OPP), etc.

It is to be understood that the figures and descriptions of the embodiments have been simplified to illustrate elements that are relevant for a clear understanding of the embodiments, while eliminating, for purposes of clarity, other elements. For example, certain operating system details and power supply-related components are not described herein. Those of ordinary skill in the art will recognize, however, that these and other elements may be desirable in inspection systems as described hereinabove. However, because such elements are well known in the art and because they do not facilitate a better understanding of the embodiments, a discussion of such elements is not provided herein.

In general, it will be apparent to one of ordinary skill in the art that at least some of the embodiments described herein may be implemented in many different embodiments of software, firmware and/or hardware. The software and firmware code may be executed by a processor (such as a processor of the control system 102, the various image processors 210, etc.) or any other similar computing device. The software code or specialized control hardware which may be used to implement embodiments is not limiting. The processors and other programmable components disclosed herein may include non-transitory memory for storing certain software applications used in obtaining, processing and communicating information. It can be appreciated that such non-transitory memory may be internal or external with respect to operation of the disclosed embodiments. The memory may also include any means for storing software, including a hard disk, an optical disk, floppy disk, ROM (read only memory), RAM (random access memory), PROM (programmable ROM), EEPROM (electrically erasable PROM) and/or other computer-readable media.

In various embodiments disclosed herein, a single component may be replaced by multiple components and multiple components may be replaced by a single component, to perform a given function or functions. Except where such substitution would not be operative, such substitution is within the intended scope of the embodiments. For example, processor 142 may be replaced with multiple processors.

While various embodiments have been described herein, it should be apparent that various modifications, alterations and adaptations to those embodiments may occur to persons skilled in the art with attainment of at least some of the advantages. The disclosed embodiments are therefore intended to include all such modifications, alterations and adaptations without departing from the scope of the embodiments as set forth herein.

We claim:

1. A blow molder system comprising:
    a blow molder for performing a blow molding process, wherein the blow molder comprises:
        heating elements;
        a stretching rod; and
        a plurality of molds; and
        one or more blow molder temperature sensors for sensing temperatures of the blow molder; and
        wherein the blow molding process comprises a pre-blow, stretching by the stretching rod, and a high-pressure blow;
    an inspection system for sensing one or more characteristics of plastic objects involved in the blow molding process; and
    a control system that is in communication with the one or more blow molder temperature sensors and in communication with the inspection system, wherein the control system is configured to:
        tune the blow molder system to establish a baseline characteristic of the plastic objects involved in the blow molding process;
        generate a model based on initial operating parameters for the blow molder and the one or more characteristics of the plastic objects sensed by the inspection system;
        determine, using the model, updated operating parameters for the blow molder based on, at least in part, the one or more characteristics of the plastic objects sensed by the inspection system and the baseline characteristic to drive the one or more characteristics of the plastic object toward the baseline characteristic; and
        output the updated operating parameters to the blow molder,
    wherein:
        the blow molder is configured to implement the updated operating parameters; and
        the updated operating parameters comprise:
            an updated pre-blow pressure level for the pre-blow;
            an updated high-pressure blow pressure level for the high-pressure blow; and
            a blow timing for the blow molding process.

2. The blow molder system of claim 1, wherein:
    the blow molder produces plastic containers from plastic preforms; and
    the one or more characteristics comprise one or more characteristics of the containers produced by the blow molder.

3. The blow molder system of claim 2, wherein the plastic objects comprise the plastic containers produced by the blow molder.

4. The blow molder system of claim 1, wherein:
    the inspection system further comprises a vision system for capturing images of the plastic objects; and
    the control system is further configured to determine the updated operating parameters additionally based on the images captured by the vision system.

5. The blow molder system of claim 1, wherein the control system is further configured to determine the updated operating parameters additionally based on temperatures sensed by the one or more blow molder temperature sensors.

6. The blow molder system of claim 1, wherein the heating elements of the blow molder comprise oven lamps.

7. The blow molder system of claim 6, wherein the one or more blow molder temperature sensors comprises one or more pyrometers.

8. The blow molder system of claim 1, wherein the control system is further configured to determine the updated operating parameters additionally based on the temperatures of the plurality of molds sensed by the one or more blow molder temperature sensors.

9. The blow molder system of claim 2, wherein the control system is configured to control the blow molder parameters to achieve a desired quality level for the containers produced by the blow molder.

10. The blow molder system of claim 9, wherein the blow molder stretches the preforms by blowing fluid into the preforms to stretch the preforms to form the containers.

11. The blow molder system of claim 10, wherein the fluid comprises air.

12. The blow molder system of claim 1, wherein:
    the blow molder comprises a liquid for controlling temperatures of the plurality of molds;
    the one or more blow molder temperature sensors comprise one or more mold temperature sensors; and
    the control system is further configured to determine the updated operating parameters additionally based on the temperatures of the plurality of molds sensed by the one or more mold temperature sensors.

13. The blow molder system of claim 1, wherein the updated operating parameters determined by the control system comprise temperature set points for the plurality of molds.

14. The blow molder system of claim 1, wherein the control system comprises a server.

15. The blow molder system of claim 1, wherein the model comprises a regression model.

16. The blow molder system of claim 1, wherein the plastic objects comprise polyethylene terephthalate.

17. The blow molder system of claim 9, wherein the desired quality level comprises a material distribution for the containers.

18. The blow molder system of claim 1, wherein:
    the inspection system further comprises a vision system for capturing images of the plastic objects; and
    the control system comprises a processor that is configured to detect defects in the plastic objects from the images captured by the vision system.

19. The blow molder system of claim 18, wherein the vision system comprises an overhead vision system that captures images from above and looking downwardly on the plastic objects.

20. The blow molder system of claim 18, wherein the vision system comprises a side vision system that captures images of a sidewall of the plastic objects.

* * * * *